(12) United States Patent
Obernosterer et al.

(10) Patent No.: US 11,700,032 B2
(45) Date of Patent: Jul. 11, 2023

(54) GENERATION OF CHANNEL ACCESS PATTERNS FOR MUTUALLY UNCOORDINATED NETWORKS

(71) Applicant: Fraunhofer-Gesellschaft zur Förderung der angewandten Forschung e.V., Munich (DE)

(72) Inventors: Frank Obernosterer, Nuremberg (DE); Raimund Meyer, Fürth (DE); Gerd Kilian, Erlangen (DE); Josef Bernhard, Erlangen (DE); Johannes Wechsler, Erlangen (DE); Jakob Kneißl, Erlangen (DE); Stefan Ereth, Erlangen (DE); Jörg Robert, Uttenreuth (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 17/127,188

(22) Filed: Dec. 18, 2020

(65) Prior Publication Data
US 2021/0105041 A1   Apr. 8, 2021

Related U.S. Application Data

(63) Continuation of application No. PCT/EP2019/066289, filed on Jun. 19, 2019.

(30) Foreign Application Priority Data

Jun. 22, 2018   (DE) .......................... 102018210245.7

(51) Int. Cl.
*H04B 1/7143* (2011.01)
*H04W 76/11* (2018.01)
(Continued)

(52) U.S. Cl.
CPC ......... *H04B 1/7143* (2013.01); *H04L 1/1642* (2013.01); *H04L 9/0662* (2013.01);
(Continued)

(58) Field of Classification Search
CPC ........ H04B 1/69; H04B 1/713; H04B 1/7143; H04B 7/18582; H04B 7/204; H04B 7/208;
(Continued)

(56) References Cited

U.S. PATENT DOCUMENTS 6,041,046 A * 3/2000 Scott .................... H04B 7/2656
                                                                375/138
7,035,310 B1    4/2006 Roberts
(Continued)

FOREIGN PATENT DOCUMENTS

DE   102011082098 B4   4/2014
DE   102017206236 A1   10/2018
(Continued)

OTHER PUBLICATIONS

IEEE Std. 802.15.4—2015—IEEE Standard for Low-Rate Wireless Networks, 2015.
(Continued)

*Primary Examiner* — Warner Wong
(74) *Attorney, Agent, or Firm* — NKL Law; Jae Youn Kim

(57) ABSTRACT

Proposed is a controller for a participant of a communication system, wherein the communication system wirelessly communicates in a frequency band that is used for communication by a plurality of communication systems, wherein the controller is configured to identify a channel access pattern, wherein the channel access pattern indicates a frequency hop-based and/or time hop-based occupancy of the frequency band that is usable for the communication of the
(Continued)

200

Transmitting a signal, wherein the signal comprises information about a channel access pattern, wherein the channel access pattern indicates a frequency hop-based and/or time hop-based occupancy of the frequency band that is usable for the communication of the communication system, wherein the information describes a state of a numerical sequence generator for generating a numerical sequence, or wherein the information describes a number of a numerical sequence, wherein the numerical sequence determines the channel access pattern ~202 communication system, wherein the controller is configured to identify the channel access pattern as a function of individual information of the communication system and as a function of a state of a numerical sequence generator for generating a numerical sequence or a number of a numerical sequence.

67 Claims, 21 Drawing Sheets

(51) Int. Cl.
    *H04L 1/1607*     (2023.01)
    *H04L 9/06*     (2006.01)
    *H04W 72/0453*     (2023.01)
    *H04W 72/53*     (2023.01)

(52) U.S. Cl.
    CPC ....... *H04W 72/0453* (2013.01); *H04W 72/53* (2023.01); *H04W 76/11* (2018.02)

(58) Field of Classification Search
    CPC .... H04B 7/212; H04B 7/2615; H04B 7/2621; H04B 7/2643; H04B 2001/6908; H04B 1/7136; H04W 72/04; H04W 72/044; H04W 72/0453; H04W 76/00; H04W 76/10; H04W 76/11; H04W 74/00; H04W 74/02; H04W 5/0012; H04W 72/0493; H04L 9/0662; H04L 9/0668; H04L 1/1607; H04L 1/1642; H04L 1/165; H04L 12/2856
    See application file for complete search history.

(56) References Cited

U.S. PATENT DOCUMENTS

| | | |
|---|---|---|
| 7,116,700 B1 | 10/2006 | Sivakumar |
| 2005/0159106 A1* | 7/2005 | Palin .......................... H04L 5/06 375/132 |
| 2005/0176371 A1* | 8/2005 | Palin .................... H04B 1/7143 455/39 |
| 2007/0183338 A1 | 8/2007 | Propach et al. |
| 2008/0101319 A1* | 5/2008 | Rao ........................ H04L 5/0094 370/342 |
| 2009/0074033 A1 | 3/2009 | Kattwinkel |
| 2010/0034239 A1* | 2/2010 | Keshavarzian ...... H04B 1/7156 375/E1.037 |
| 2011/0235684 A1* | 9/2011 | Dahlman .................. H04B 1/59 375/135 |
| 2011/0305232 A1 | 12/2011 | Hsieh et al. |
| 2011/0317745 A1* | 12/2011 | Okubo ................ H04L 27/2613 375/E1.003 |
| 2012/0243576 A1* | 9/2012 | Hancock .............. H04B 1/7156 375/136 |
| 2014/0176341 A1 | 6/2014 | Bernhard et al. |
| 2014/0376356 A1* | 12/2014 | Park ...................... H04L 5/0035 370/203 |
| 2014/0376484 A1* | 12/2014 | Park .................... H04L 27/2613 370/329 |
| 2015/0085817 A1* | 3/2015 | Liu ........................ H04L 5/0012 370/330 |
| 2015/0163814 A1 | 6/2015 | Bansal et al. |
| 2017/0213446 A1 | 7/2017 | Sharma et al. |
| 2018/0324868 A1* | 11/2018 | Gaal ........................ H04W 4/70 |
| 2019/0028143 A1* | 1/2019 | Zhang ............... H04W 74/0833 |
| 2019/0280734 A1* | 9/2019 | Park .................... H04L 5/0012 |
| 2020/0044687 A1 | 2/2020 | Bernhard et al. |
| 2020/0366439 A1* | 11/2020 | Choi ..................... H04L 5/0051 |

FOREIGN PATENT DOCUMENTS

| | | |
|---|---|---|
| DE | 102018210243 A1 | 12/2019 |
| EP | 3220696 A1 | 9/2017 |
| JP | 2003506956 A | 2/2003 |
| JP | 2003518855 A | 6/2003 |
| JP | 2016537857 A | 12/2016 |
| WO | 2015020717 A1 | 2/2015 |
| WO | 2016031343 A | 3/2016 |
| WO | 2019/243465 A1 | 12/2019 |

OTHER PUBLICATIONS

Takeshi Aoki, "Office Action for JP Application No. 2020-571713", dated Mar. 30, 2022, JPO, Japan.

* cited by examiner

210

Receiving a signal, wherein the signal comprises information about a channel access pattern, wherein the channel access pattern indicates a frequency hop-based and/or time hop-based occupancy of the frequency band that is usable for the communication of the communication system ⎯212

Determining the channel access pattern on the basis of the information about the channel access pattern, wherein the information describes a state of a numerical sequence generator for generating a numerical sequence, or wherein the information describes a number of a numerical sequence, wherein the numerical sequence determines the channel access pattern ⎯214

Fig. 18

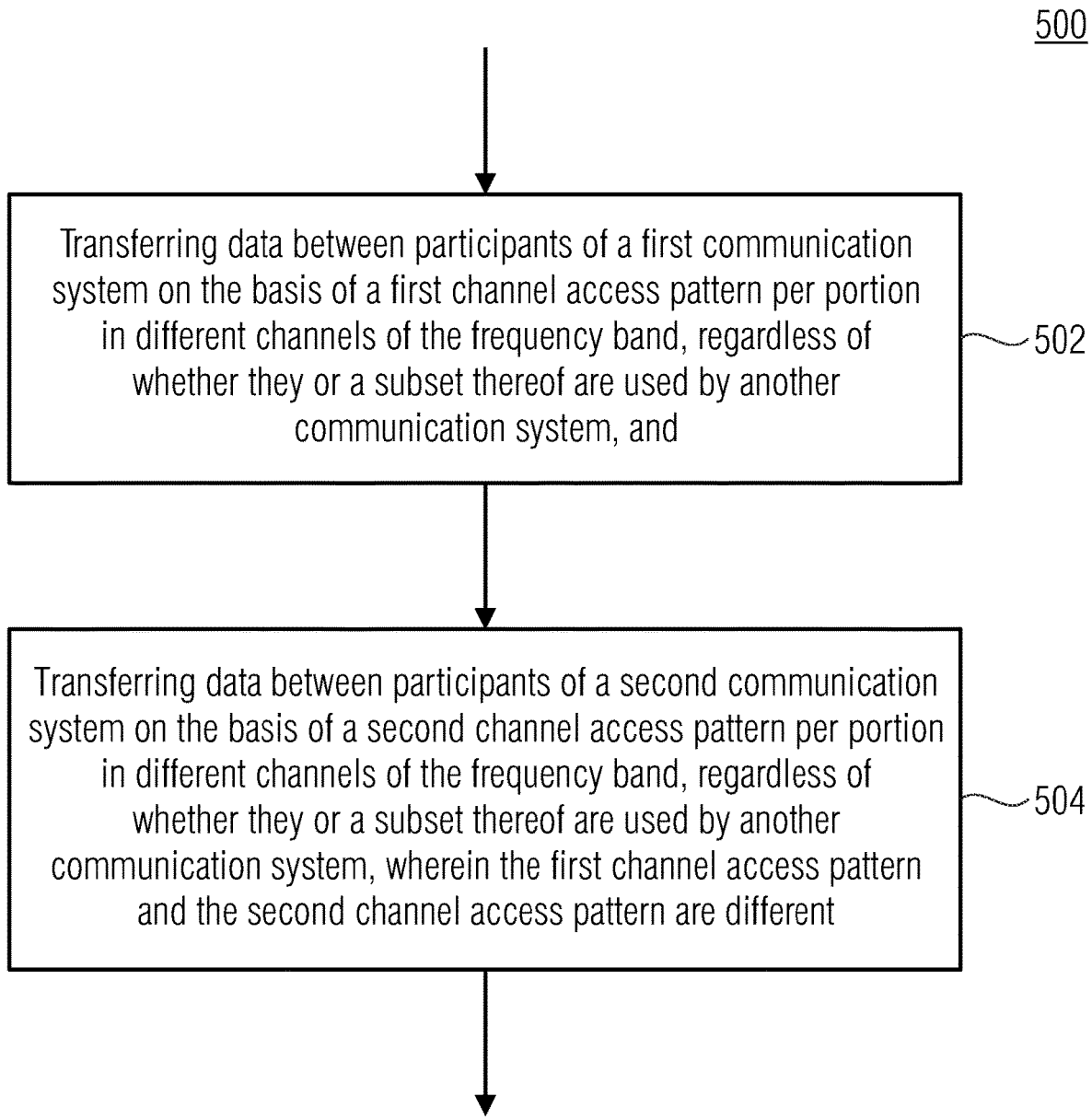

GENERATION OF CHANNEL ACCESS PATTERNS FOR MUTUALLY UNCOORDINATED NETWORKS

CROSS-REFERENCES TO RELATED APPLICATIONS

This application is a continuation of copending International Application No. PCT/EP2019/066289, filed Jun. 19, 2019, which is incorporated herein by reference in its entirety, and additionally claims priority from German Application No. DE102018210245.7, filed Jun. 22, 2018, which is incorporated herein by reference in its entirety.

BACKGROUND OF THE INVENTION

Embodiments of the present invention relate to a controller for a participant of a communication system, to a base station of a communication system, to a terminal point of the communication system, and to the communication system, wherein the communication system wirelessly communicates in a frequency band used for communication by a plurality of communication systems. Some embodiments relate to a generation of channel access patterns for mutually uncoordinated networks.

In the wireless communication between participants of a communication system in a frequency band used for communication by a plurality of communication systems, the avoidance of interferences by disturbance signals of other communication systems (=communication between participants of other communication systems) is needed.

Disturbances of participants within the own radio network (or communication system) are often avoided by a coordinated conflict-free allocation of radio resources (e.g. done by a base station). For example, this is done in the mobile radio standards GSM, UMTS, and LTE, where (outside of the initial network logon phase) collisions of radio participants within the same network may be fully avoided by the so-called "scheduling".

Disturbances by radio participants outside of the own network are often reduced by suitable radio network planning. In this case, a certain usable frequency range (possibly consisting of several frequency channels) from the entire available frequency band is allocated to each network. Adjacent networks use different frequency ranges, which is why there are no direct disturbances between participants of adjacent networks. In the end, this method also represents a type of coordination between networks.

If such a specified allocation of frequency ranges or radio channels to individual networks is not possible or not feasible (e.g. as is often times the case on non-licensed frequency bands), a network may determine an unused frequency range, e.g. or the least used one, from a set of specified frequency ranges by means of a utilization measurement and then occupy the same, or switch thereto.

A further case is the transmission of messages (data packets) by means of the so-called Telegram Splitting Multiple Access (TSMA) method [1]. Here, the frequency range usable by a network is divided into a specified number of frequency channels, wherein a data packet is transferred divided onto a plurality of partial data packets, which are typically transmitted at different points in time and on different frequency channels. In this case, the hopping pattern (or time/frequency hopping pattern) used for transferring the partial data packets plays a particularly important role, as is shown in [2], for example. A particularly high utilization of networks can be achieved if there are as many different hopping patterns as possible, containing among themselves only as few and short overlapping sequences as possible. In order to decrease the interference of several networks among themselves, the networks may use different hopping patterns relative to each other. These network-individual hopping patterns have to be known to all participants in the respective networks. Furthermore, it is desirable that the hopping patterns—as described above—have only short overlapping sequences with respect to each other so as to avoid systematic collision between partial data packets of participants of different networks.

In mutually coordinated networks, it is possible to allocate to each network an individual hopping pattern that has as little overlap as possible with the hopping patterns of other networks in the reception range. The totality of all available hopping patterns may be tabulated as a set (of hopping patterns) from which the network-wide coordinating instance allocates one/several individual hopping pattern(s) to each network. The calculation of a set of suitable hopping patterns may be done in advance according to suitable optimization criteria.

If networks are not mutually coordinated and possibly also not synchronized temporally and in the frequency domain, the above method (tabulated, pre-calculated hopping patterns) may be applied in principle, however, there is the risk that two networks randomly use the same hopping pattern. In order to decrease to a feasible extent the probability that two (mutually influencing) networks use the same hopping pattern, an extraordinarily large number of available hopping patterns would have to exist, particularly in a scenario with many networks.

Thus, it is an object of the present invention to provide a concept that increases the transfer reliability if several mutually uncoordinated communication systems use for the wireless communication the same frequency band.

SUMMARY

An embodiment may have a base station of a communication system, wherein the communication system wirelessly communicates in a frequency band that is used for communication by a plurality of communication systems, wherein the base station is configured to transmit a signal, wherein the signal has information about a channel access pattern, wherein the channel access pattern indicates a frequency hop-based and/or time hop-based occupancy of the frequency band that is usable for the communication of the communication system, wherein the information describes a state of a numerical sequence generator for generating a numerical sequence, or wherein the information describes a number of a numerical sequence, wherein the numerical sequence determines the channel access pattern, wherein the base station is configured to communicate with a participant of the communication system by using a real subset of the resources determined by the channel access pattern.

Another embodiment may have a terminal point of a communication system, wherein the communication system wirelessly communicates in a frequency band that is used for communication by a plurality of communication systems, wherein the terminal point is configured to receive a signal, wherein the signal has information about a channel access pattern, wherein the channel access pattern indicates a frequency hop-based and/or time hop-based occupancy of the frequency band that is usable for the communication of the communication system, wherein the terminal point is configured to identify the channel access pattern on the basis of the information about the channel access pattern, wherein the information describes a state of a numerical sequence generator for generating a numerical sequence, or wherein the information describes a number of a numerical sequence, wherein the numerical sequence determines the channel access pattern, wherein the terminal point is configured to communicate with a participant of the communication system by using a real subset of the resources determined by the channel access pattern.

Another embodiment may have a communication system, having: a base station of a communication system, wherein the communication system wirelessly communicates in a frequency band that is used for communication by a plurality of communication systems, wherein the base station is configured to transmit a signal, wherein the signal has information about a channel access pattern, wherein the channel access pattern indicates a frequency hop-based and/or time hop-based occupancy of the frequency band that is usable for the communication of the communication system, wherein the information describes a state of a numerical sequence generator for generating a numerical sequence, or wherein the information describes a number of a numerical sequence, wherein the numerical sequence determines the channel access pattern, wherein the base station is configured to communicate with a participant of the communication system by using a real subset of the resources determined by the channel access pattern; and at least one terminal point of a communication system, wherein the communication system wirelessly communicates in a frequency band that is used for communication by a plurality of communication systems, wherein the terminal point is configured to receive a signal, wherein the signal has information about a channel access pattern, wherein the channel access pattern indicates a frequency hop-based and/or time hop-based occupancy of the frequency band that is usable for the communication of the communication system, wherein the terminal point is configured to identify the channel access pattern on the basis of the information about the channel access pattern, wherein the information describes a state of a numerical sequence generator for generating a numerical sequence, or wherein the information describes a number of a numerical sequence, wherein the numerical sequence determines the channel access pattern, wherein the terminal point is configured to communicate with a participant of the communication system by using a real subset of the resources determined by the channel access pattern.

Another embodiment may have a method for operating a base station of a communication system, wherein the communication system wirelessly communicates in a frequency band that is used for communication by a plurality of communication systems, the method having the steps of: transmitting a signal, wherein the signal has information about a channel access pattern, wherein the channel access pattern indicates a frequency hop-based and/or time hop-based occupancy of the frequency band that is usable for the communication of the communication system, wherein the information describes a state of a numerical sequence generator for generating a numerical sequence, or wherein the information describes a number of a numerical sequence, wherein the numerical sequence determines the channel access pattern, communicating with a participant of the communication system by using a real subset of the resources determined by the channel access pattern.

Another embodiment may have a method for operating a terminal point of a communication system, wherein the communication system wirelessly communicates in a frequency band that is used for communication by a plurality of communication systems, the method having the steps of: receiving a signal, wherein the signal has information about a channel access pattern, wherein the channel access pattern indicates a frequency hop-based and/or time hop-based occupancy of the frequency band that is usable for the communication of the communication system, identifying the channel access pattern on the basis of the information about the channel access pattern, wherein the information describes a state of a numerical sequence generator for generating a numerical sequence, or wherein the information describes a number of a numerical sequence, wherein the numerical sequence determines the channel access pattern, communicating with a participant of the communication system by using a real subset of the resources determined by the channel access pattern.

Another embodiment may have a non-transitory digital storage medium having a computer program stored thereon to perform the method for operating a base station of a communication system, wherein the communication system wirelessly communicates in a frequency band that is used for communication by a plurality of communication systems, the method having the steps of: transmitting a signal, wherein the signal has information about a channel access pattern, wherein the channel access pattern indicates a frequency hop-based and/or time hop-based occupancy of the frequency band that is usable for the communication of the communication system, wherein the information describes a state of a numerical sequence generator for generating a numerical sequence, or wherein the information describes a number of a numerical sequence, wherein the numerical sequence determines the channel access pattern, communicating with a participant of the communication system by using a real subset of the resources determined by the channel access pattern, when said computer program is run by a computer.

Another embodiment may have a non-transitory digital storage medium having a computer program stored thereon to perform the method for operating a terminal point of a communication system, wherein the communication system wirelessly communicates in a frequency band that is used for communication by a plurality of communication systems, the method having the steps of: receiving a signal, wherein the signal has information about a channel access pattern, wherein the channel access pattern indicates a frequency hop-based and/or time hop-based occupancy of the frequency band that is usable for the communication of the communication system, identifying the channel access pattern on the basis of the information about the channel access pattern, wherein the information describes a state of a numerical sequence generator for generating a numerical sequence, or wherein the information describes a number of a numerical sequence, wherein the numerical sequence determines the channel access pattern, communicating with a participant of the communication system by using a real subset of the resources determined by the channel access pattern, when said computer program is run by a computer.

Embodiments provide a base station of a communication system, wherein the communication system wirelessly communicates in a frequency band [e.g. a license-free and/or permission-free frequency band; e.g. the ISM bands] that is used for communication by a plurality of communication systems, wherein the base station is configured to transmit a signal [e.g. a beacon signal], wherein the signal comprises information about a channel access pattern, wherein the channel access pattern indicates a frequency hop-based and/or time hop-based occupancy [e.g. of resources] of the frequency band that is usable for the communication of the communication system [e.g. a temporal sequence of frequency resources (e.g. distributed across the frequency band) that are usable for the communication of the communication system], wherein the information describes a state of a numerical sequence generator [e.g. a periodic numerical sequence generator or a deterministic random number generator] for generating a numerical sequence, or wherein the information describes a number [e.g. a time slot index and/or a beacon index] of a numerical sequence [e.g. a periodic time slot index sequence and/or a periodic beacon index sequence], wherein the numerical sequence determines the channel access pattern.

In embodiments, the channel access pattern may differ from another channel access pattern on the basis of which at least one other communication system of the plurality of other communication systems accesses the frequency band.

In embodiments, the base station may be configured to operate uncoordinatedly with respect to the other communication systems.

In embodiments, the base station may be configured to communicate with a participant of the communication system by using the resources determined by the channel access pattern or a subset thereof.

In embodiments, the base station may be configured to emit the signal with the information about the channel access pattern multiple times [e.g. periodically], wherein the information about the channel access pattern transferred with consecutive emissions of the signal describe different [e.g. consecutive or immediately consecutive] states of the numerical sequence generator or different numbers of the numerical sequence.

In embodiments, the information transferred with the emissions of the signal may describe only a subset of the states of the numerical sequence generator or of the numbers of the numerical sequence [e.g. only every n-th state or every n-th index number is transferred, wherein n is a natural number larger than or equal to two].

In embodiments, the information about the channel access pattern may be the state of the numerical sequence generator or information derived therefrom [e.g. a part of the state of the numerical sequence generator (e.g. LSBs of the state of the numerical sequence generator)].

In embodiments, the information about the channel access pattern may be the number of the numerical sequence or information derived therefrom [e.g. a part of the state of the numerical sequence (e.g. LSBs of the number of the numerical sequence)].

In embodiments, the base station may be configured to identify the channel access pattern as a function of the state of the numerical sequence generator or of a number of the numerical sequence derived from the state of the numerical sequence generator.

In embodiments, states of the numerical sequence generator [e.g. directly] following the state of the numerical sequence generator may be identifiable on the basis of the state of the numerical sequence generator, wherein the base station may be configured to identify the channel access pattern as a function of the following states of the numerical sequence generator or following numbers of the numerical sequence derived therefrom.

In embodiments, the base station may be configured to identify the channel access pattern as a function of individual information of the communication system [e.g. intrinsic information of the communication system such as a network-specific identifier].

In embodiments, the individual information of the communication system may be intrinsic information of the communication system.

In embodiments, the intrinsic information of the communication system may be a network-specific identifier.

In embodiments, the network-specific identifier may be an identification of the communication system.

In embodiments, the base station may be configured to map, by using a mapping function,
    the state of the numerical sequence generator or a number of the numerical sequence derived from the state of the numerical sequence generator, or the number of the numerical sequence, and
    the individual information of the communication system, onto time information and frequency information, wherein the time information and the frequency information describe a resource of the channel access pattern.

In embodiments, the time index information may describe a time slot or a time slot index.

In embodiments, when mapping the time information, the mapping function may consider an activity rate of the communication system, wherein the activity rate is specified before the execution, or wherein the signal or a further signal transmitted by the base station comprises information about the activity rate.

In embodiments, when mapping onto the time information, the mapping function may consider different activity rates of the communication system so that the channel access pattern comprises regions of different activity rates, wherein the signal or the further signal comprises information about the activity rates.

In embodiments, the base station may be configured to dynamically adapt the activity rate as a function of a current or predicted utilization situation of the communication system.

In embodiments, when mapping onto the time information, the mapping function may adhere to a specified minimum distance [e.g. of one or several time slots or time slot indices] between [e.g. directly] consecutive time slots or time slot indices of the channel access pattern.

In embodiments, the frequency information may describe a frequency channel or a frequency channel index.

In embodiments, the frequency information may describe a distance between [e.g. directly] consecutive frequency channels or frequency channel indices of the channel access pattern.

In embodiments, when mapping onto the frequency information, the mapping function may adhere to a specified minimum distance between [e.g. directly] consecutive frequency channels or frequency channel indices of the channel access pattern.

In embodiments, when mapping onto the frequency information, the mapping function may consider an interference-prone frequency channel or a range of interference-prone frequency channels of the frequency band so that the interference-prone frequency channel or the range of interference-prone frequency channels is not or less occupied by the channel access pattern.

In embodiments, the frequency information may describe a bundling of frequency resources of the frequency band including at least two directly adjacent or spaced apart frequency channels or frequency channel indices.

In embodiments, the base station may configured to identify a pseudo random number R as a function of:

the state of the numerical sequence generator, or a number of the numerical sequence derived from the state of the numerical sequence generator, or the number of the numerical sequence, and individual information of the communication system, wherein the pseudo random number R determines the channel access pattern.

In embodiments, the base station may be configured to identify a resource [e.g. a frequency channel and/or time slot, or a frequency channel index and/or time slot index] of the channel access pattern on the basis of the pseudo random number R.

In embodiments, the signal may a beacon signal.

In embodiments, the numerical sequence generator may be a periodic numerical sequence generator for generating a periodic numerical sequence.

In embodiments, the numerical sequence generator may be a deterministic random number generator for generating a pseudo-random numerical sequence.

In embodiments, the state of the numerical sequence generator may be a periodic beacon index and/or a periodic time slot index, In embodiments, a number derived from the state of the numerical sequence generator may be a periodic beacon index and/or a periodic time slot index.

In embodiments, the number of the numerical sequence may be a periodic beacon index and/or a periodic time slot index.

In embodiments, an occupancy of the frequency band defined by the channel access pattern may at least partially overlap an occupancy of the frequency band by another communication system.

Furth embodiments provide a terminal point of a communication system, wherein the communication system wirelessly communicates in a frequency band [e.g. a license-free and/or permission-free frequency band; e.g. the ISM bands] that is used for communication by a plurality of communication systems, wherein the terminal point is configured to receive a signal [e.g. a beacon signal], wherein the signal comprises information about a channel access pattern, wherein the channel access pattern indicates a frequency hop-based and/or time hop-based occupancy [e.g. of resources] of the frequency band that is usable for the communication of the communication system [e.g. a temporal sequence of frequency resources (e.g. distributed across the frequency band) that are usable for the communication of the communication system], wherein the terminal point is configured to identify the channel access pattern on the basis of the information about the channel access pattern, wherein the information describes a state of a numerical sequence generator [e.g. a periodic numerical sequence generator or a deterministic random number generator] for generating a numerical sequence, or wherein the information describes a number [e.g. a time slot index and/or a beacon index] of a numerical sequence [e.g. a periodic time slot index sequence and/or a periodic beacon index sequence], wherein the numerical sequence determines the channel access pattern.

In embodiments, the channel access pattern may differ from another channel access pattern on the basis of which at least one other communication system of the plurality of other communication systems accesses the frequency band.

In embodiments, the terminal point may be configured to operate uncoordinatedly with respect to the other communication systems.

In embodiments, the terminal point may be configured to communicate with a participant of the communication system by using the resources determined by the channel access pattern or a subset thereof.

In embodiments, the terminal point may be configured to receive the signal with the information about the channel access pattern multiple times [e.g. periodically], wherein the information about the channel access pattern transferred with consecutive emissions of the signal describe different [e.g. consecutive or immediately consecutive] states of the numerical sequence generator or different numbers of the numerical sequence, wherein the terminal point may be configured to identify the channel access pattern on the basis of the information about the channel access pattern [e.g. on the basis of the different states of the numerical sequence generator or the different numbers of the numerical sequence].

In embodiments, the information transferred with the emissions of the signal may describe only a subset of the states of the numerical sequence generator or of the numbers of the numerical sequence [e.g. only every n-th state or every n-th index number is transferred, wherein n is a natural number larger than or equal to two].

In embodiments, the information about the channel access pattern may be the state of the numerical sequence generator or information derived therefrom [e.g. a part of the state of the numerical sequence generator (e.g. LSBs of the state of the numerical sequence generator)], In embodiments, the information about the channel access pattern may be the number of the numerical sequence or information derived therefrom [e.g. a part of the state of the numerical sequence (e.g. LSBs of the number of the numerical sequence)].

In embodiments, the terminal point may be configured to identify the channel access pattern as a function of the state of the numerical sequence generator or of a number of the numerical sequence derived from the state of the numerical sequence generator.

In embodiments, states of the numerical sequence generator [e.g. directly] following the state of the numerical sequence generator may be identifiable on the basis of the state of the numerical sequence generator, wherein the terminal point may be configured to identify the channel access pattern as a function of the following states of the numerical sequence generator or following numbers of the numerical sequence derived therefrom.

In embodiments, the terminal point may be configured to identify the channel access pattern as a function of individual information of the communication system [e.g. intrinsic information of the communication system such as a network-specific identifier].

In embodiments, the individual information of the communication system may be intrinsic information of the communication system.

In embodiments, the intrinsic information of the communication system may be a network-specific identifier.

In embodiments, the network-specific identifier may be an identification of the communication system.

In embodiments, the terminal point may be configured to map, by using a mapping function, the state of the numerical sequence generator or a number of the numerical sequence derived from the state of the numerical sequence generator, or the number of the numerical sequence, and the individual information of the communication system onto time information and frequency information, wherein the time information and the frequency information describe a resource of the channel access pattern.

In embodiments, the time index information may describe a time slot or a time slot index.

In embodiments, when mapping the time information, the mapping function may consider an activity rate of the communication system, wherein the activity rate is specified before the execution, or wherein the signal or a further received signal comprises information about the activity rate.

In embodiments, when mapping onto the time information, the mapping function may consider different activity rates of the communication system so that the channel access pattern comprises regions of different activity rates, wherein the signal or the further signal comprises information about the activity rates.

In embodiments, the signal comprises information about the activity rates of the communication system.

In embodiments, the terminal point may be configured to receive a further signal, wherein the further signal comprises information about the activity rates of the communication system.

In embodiments, when mapping onto the time information, the mapping function may adhere to a specified minimum distance [e.g. of one or several time slots or time slot indices] between [e.g. directly] consecutive time slots or time slot indices of the channel access pattern.

In embodiments, the frequency information may describe a frequency channel or a frequency channel index.

In embodiments, the frequency information may describe a distance between [e.g. directly] consecutive frequency channels or frequency channel indices of the channel access pattern.

In embodiments, when mapping onto the frequency information, the mapping function may adhere to a specified minimum distance between [e.g. directly] consecutive frequency channels or frequency channel indices of the channel access pattern.

In embodiments, when mapping onto the frequency information, the mapping function may consider an interference-prone frequency channel or a range of interference-prone frequency channels of the frequency band so that the interference-prone frequency channel or the range of interference-prone frequency channels is not or less occupied by the channel access pattern.

In embodiments, the frequency information may describe at least two directly adjacent or spaced apart frequency channels or frequency channel indices.

In embodiments, the terminal point may be configured to identify a pseudo random number R as a function of:
the state of the numerical sequence generator, or a number of the numerical sequence derived from the state of the numerical sequence generator, or the number of the numerical sequence, and
individual information of the communication system,
wherein the pseudo random number R determines the channel access pattern.

In embodiments, the terminal point may be configured to identify a resource [e.g. a frequency channel and/or time slot, or a frequency channel index and/or time slot index] of the channel access pattern on the basis of the pseudo random number R.

In embodiments, the signal may be a beacon signal.

In embodiments, the numerical sequence generator may be a periodic numerical sequence generator for generating a periodic numerical sequence.

In embodiments, the numerical sequence generator may be a deterministic random number generator for generating a pseudo-random numerical sequence.

In embodiments, the state of the numerical sequence generator may be a periodic beacon index and/or a periodic time slot index, In embodiments, a number derived from the state of the numerical sequence generator may be a periodic beacon index and/or a periodic time slot index.

In embodiments, the number of the numerical sequence may be a periodic beacon index and/or a periodic time slot index.

In embodiments, an occupancy of the frequency band that is defined by the channel access pattern may at least partially overlap an occupancy of the frequency band by another communication system.

Further embodiments provide a communication system having one of the above-described base stations and at least one of the above-described terminal points.

Further embodiments provide a method for operating a base station of a communication system, wherein the communication system wirelessly communicates in a frequency band that is used for communication by a plurality of communication systems. The method includes a step of transmitting a signal, wherein the signal comprises information about a channel access pattern, wherein the channel access pattern indicates a frequency hop-based and/or time hop-based occupancy of the frequency band that is usable for the communication of the communication system, wherein the information describes a state of a numerical sequence generator for generating a numerical sequence, or wherein the information describes a number of a numerical sequence, wherein the numerical sequence determines the channel access pattern.

Further embodiments provide a method for operating a terminal point of a communication system, wherein the communication system wirelessly communicates in a frequency band that is used for communication by a plurality of communication systems. The method includes a step of receiving a signal, wherein the signal comprises information about a channel access pattern, wherein the channel access pattern indicates a frequency hop-based and/or time hop-based occupancy of the frequency band that is usable for the communication of the communication system. In addition, the method includes a step of identifying the channel access pattern on the basis of the information about the channel access pattern, wherein the information describes a state of a numerical sequence generator for generating a numerical sequence, or wherein the information describes a number of a numerical sequence, wherein the numerical sequence determines the channel access pattern.

Further embodiments provide a controller for a participant of a communication system, wherein the communication system wirelessly communicates in a frequency band that is used for communication by a plurality of communication systems, wherein the controller is configured to identify a channel access pattern, wherein the channel access pattern indicates a frequency hop-based and/or time hop-based occupancy of the frequency band that is usable for the communication of the communication system, wherein the controller is configured to identify the channel access pattern as a function of a state of a numerical sequence generator for generating a numerical sequence or a number of a numerical sequence.

In embodiments, the controller may be configured to identify the channel access pattern as a function of the state of the numerical sequence generator, or of a number of the numerical sequence derived from the state of the numerical sequence generator.

In embodiments, states of the numerical sequence generator [e.g. directly] following the state of the numerical sequence generator may be identifiable on the basis of the state of the numerical sequence generator, wherein the controller may be configured to identify the channel access pattern as a function of the following states of the numerical sequence generator, or of following numbers of the numerical sequence derived therefrom.

In embodiments, the controller may be configured to identify the channel access pattern as a function of individual information of the communication system [e.g. intrinsic information of the communication system such as a network-specific identifier].

In embodiments, the controller may be configured to map, by using a mapping function, the state of the numerical sequence generator or a number of the numerical sequence derived from the state of the numerical sequence generator, or the number of the numerical sequence, and the individual information of the communication system onto time information and frequency information, wherein the time information and the frequency information describe a resource of the channel access pattern.

In embodiments, the controller may be configured to identify a pseudo random number R as a function of:

the state of the numerical sequence generator, or a number of the numerical sequence derived from the state of the numerical sequence generator, or the number of the numerical sequence, and individual information of the communication system, wherein the pseudo random number R determines the channel access pattern.

In embodiments, the controller may be configured to identify a resource [e.g. a frequency channel and/or time slot, or a frequency channel index and/or time slot index] of the channel access pattern on the basis of the pseudo random number R.

Further embodiments provide a method for generating a channel access pattern. The method includes a step of generating the channel access pattern, where the channel access pattern indicates a frequency hop-based and/or time hop-based occupancy of the frequency band that is usable for the communication of a communication system, wherein the communication system wirelessly communicates in a frequency band that is used for communication by a plurality of communication systems, wherein the channel access pattern is generated as a function of a state of a numerical sequence generator for generating a numerical sequence or a number of a numerical sequence.

Further embodiments provide a communication system, wherein the communication system is configured to wirelessly communicate in a frequency band [e.g. a license-free and/or permission-free frequency band; e.g. the ISM bands] that is used for communication by a plurality of communication systems, wherein the communication system is configured to use different frequencies or frequency channels of the frequency band [e.g. into which the frequency band is divided] per portion [e.g. per time slot] for the communication on the basis of a channel access pattern, regardless of whether they are used by another communication system, wherein the channel access pattern differs from another channel access pattern on the basis of which at least one other communication system of the plurality of other communication systems accesses the frequency band.

In embodiments, the channel access pattern may indicate a frequency hop-based and/or time-hop-based occupancy [e.g. of resources] of the frequency band [e.g. a temporal sequence of frequency resources (e.g. distributed across the frequency band) that are usable for the communication of the communication system] that is usable for the communication of the communication system.

In embodiments, the communication system may be configured to communicate uncoordinatedly with respect to the other communication systems in the frequency band.

In embodiments, the communication system may be configured to identify the channel access pattern.

In embodiments, the channel access pattern may depend on individual [e.g. intrinsic] information of the communication system.

In embodiments, the channel access pattern and the other channel access pattern may overlap in less than 20% of the resources specified therein.

In embodiments, participants of the communication system may transfer data amongst themselves per portion in the different channels of the frequency band on the basis of the channel access pattern.

In embodiments, a reception bandwidth of participants of the communication system may be narrower than a bandwidth of the frequency band.

Further embodiments provide a method for operating a communication system, wherein the communication system is configured to wirelessly communicate in a frequency band [e.g. a license-free and/or permission-free frequency band; e.g. the ISM bands] that is used for communication by a plurality of communication systems. The method includes a step of transferring data between participants of the communication system per portion in different channels of the frequency band on the basis of a channel access pattern, regardless of whether they or a subset thereof are used by another communication system, wherein the channel access pattern differs from another channel access pattern on the basis of which at least one other communication system of the plurality of other communication systems accesses the frequency band.

Further embodiments provide a communication arrangement having a first communication system, and a second communication system, wherein the first communication system and the second communication system are configured to wirelessly communicate in the same frequency band [e.g. in a license-free and/or permission-free frequency band; e.g. the ISM bands] [e.g. used for communication by a plurality of communication systems], wherein the first communication system is configured to use, by using a first channel access pattern, different channels of the frequency band [e.g. into which the frequency band is divided] per portion [e.g. per time slot] for the communication, regardless of whether they or a subset thereof are used by another communication system, wherein the second communication system is configured to use, by using a second channel access pattern, different channels of the frequency band [e.g. into which the frequency band is divided] per portion [e.g. per time slot] for the communication, regardless of whether they or a subset thereof are used by another communication system, wherein the first channel access pattern and the second channel access pattern are different.

In embodiments, the first communication system and the second communication system may be mutually not coordinated.

In embodiments, participants of the first communication system may transfer data amongst themselves on the basis of the first channel access pattern per portion in the different channels of the frequency band.

In embodiments, participants of the second communication system may transfer data amongst themselves on the basis of the second channel access pattern per portion in the different channels of the frequency band.

In embodiments, the first communication system and the second communication system may not communicate with each other.

Further embodiments provide a method for operating two communication systems in a frequency band that is used for wireless communication by a plurality of communication systems. The method includes a step of transferring data between participants of the first communication system on the basis of a first channel access pattern per portion in different channels of the frequency band, regardless of whether they or a subset thereof are used by another communication system. In addition the method includes a step of transferring data between participants of the second communication system on the basis of a second channel access pattern per portion in different channels of the frequency band, regardless of whether they or a subset thereof are used by another communication system, wherein the first channel access pattern and the second channel access pattern are different.

Embodiments increase the performance of a digital radio transfer system by reducing the reciprocal disturbance between participants of different and mutually uncoordinated radio networks. According to embodiments, this effect is achieved by the generation and use of network-individual channel access patterns that have certain characteristics (described below). A particularly great benefit results in the data transfer using the telegram splitting multiple access method.

The increased performance results either (with a given load) in a reduced packet error rate or (with a given packet error rate) in a higher utilization of the networks.

BRIEF DESCRIPTION OF THE DRAWINGS

Embodiments of the present invention will be detailed subsequently referring to the appended drawings, in which:

FIG. 18 shows a flow diagram of a method for operating a terminal point of a communication system that wirelessly communicates in a frequency band that is used for communication by a plurality of communication systems, according to an embodiment of the present invention, FIG. 21 shows a flow diagram of a method for operating two communication systems in one frequency band that is used for the wireless communication by a plurality of communication systems.

DETAILED DESCRIPTION OF THE INVENTION

Figure 1:
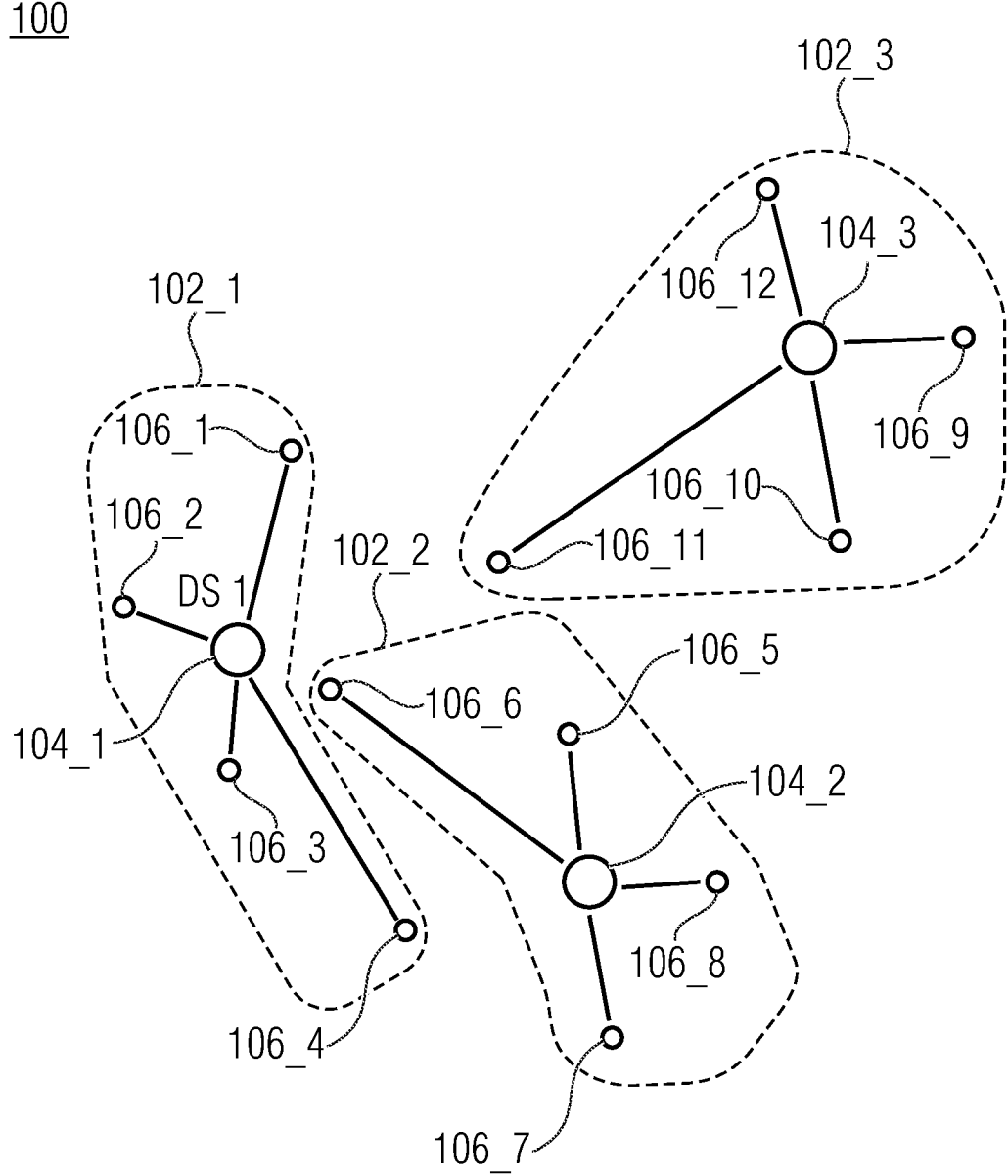
FIG. 1 shows a schematic block circuit diagram of a communication arrangement with a first communication system, according to an embodiment of the present invention.

In the subsequent description of the embodiments of the present invention, the same elements or elements having the same effect are provided with the same reference numerals in the drawings so that their description is mutually interchangeable.

FIG. 1 shows a schematic block circuit diagram of a communication arrangement 100 with a first communication system 102_1, according to an embodiment of the present invention.

The first communication system 102_1 may comprise a base station 104_1 and one or several terminal points 106_1-106_n, wherein n is a natural number larger than or equal to one. In the embodiment shown in FIG. 1, for illustrative purposes, the first communication system 102_1 comprises four terminal points 106_1-106_4, however, the first communication system 102_1 may also comprise 1, 10, 100, 1,000, 10,000, or even 100,000 terminal points.

The first communication system 102_1 may be configured to wirelessly communicate in a frequency band (e.g. a license-free and/or permission-free frequency band such as the ISM bands) used for communication by a plurality of communication systems. In this case, the frequency band may comprise a significantly larger (e.g. at least larger by a factor of two) bandwidth than reception filters of the participants of the first communication system 102_1.

As is indicated in FIG. 1, a second communication system 102_2 and a third communication system 102_3 may be in the range of the first communication system 102_1, for example, wherein these three communication systems 102_1, 102_2, and 102_3 may use the same frequency band to wirelessly communicate.

In embodiments, the first communication system 102_1 may be configured to use for the communication different frequencies or frequency channels of the frequency band (e.g. into which the frequency band is divided) in portions (e.g. in time slots) on the basis of a channel access pattern, regardless of whether these are used by another communication system (e.g. the second communication system 102_2 and/or the third communication system 102_3), wherein the channel access pattern differs from another channel access pattern based on which at least one other communication system of the plurality of other communication systems (e.g. the second communication system 102_2) accesses the frequency band.

In such a communication arrangement 100 shown in FIG. 1, the signals of mutually uncoordinated communication systems (e.g. the first communication system 102_1 and the second communication system 102_2) may therefore be separated from one another by different channel access patterns so that a reciprocal disturbance by interferences is avoided or minimized.

For example, participants of the first communication system 102_1, e.g. a base station 104_1 and several terminal points 106_1-106_4, may wirelessly communicate among themselves on the basis of a first channel access pattern (e.g. which indicates a frequency hop-based occupancy (e.g. of resources) of the frequency band, usable for the communication of the first communication system 102_1), whereas participants of the second communication system 102_2, e.g. a base station 104_2 and several terminal points 106_5-106_8, may wirelessly communicate among themselves on the basis of a second channel access pattern (e.g. which indicates a frequency hop-based occupancy (e.g. of resources) of the frequency band, usable for the communication of the second communication system 102_2), wherein the first channel access pattern and the second channel access pattern are different (e.g. comprise an overlap of less than 20% in the resources used, in the ideal case there is no overlap).

As mentioned above, the communication systems (e.g. the first communication system 102_1 and the second communication system 102_2) are mutually uncoordinated.

The communication systems 102_1, 102_2, 102_3 being mutually uncoordinated refers to the fact that the communication systems mutually (=among the communication systems) do not exchange any information about the respectively used channel access pattern, or, in other words, a communication system does not have any knowledge about the channel access pattern used by another communication system. Thus, the first communication system 102_1 does not know which channel access pattern is used by another communication system (e.g. the second communication system 102_2).

Thus, embodiments refer to a communication arrangement 100 of mutually uncoordinated and, possibly, mutually unsynchronized radio networks (or communication systems) 102_1, 102_2 for the transfer of data which access a mutually used frequency band. In other words, there are at least two radio networks 102_1, 102_2 that operate independently of one another. Both networks 102_1, 102_2 use the same frequency band.

In embodiments, it is assumed that in each individual data transfer only a (small) part of the frequency band is used, e.g. a frequency channel or a partial frequency channel. For example, the frequency band may be split into (partial) frequency channels, wherein a frequency channel is a real subset of the total frequency band. The totality of all available frequency channels constitutes the frequency band used. For example, in the telegram-splitting method, the transfer of a message (data packet) may be carried out consecutively via a sequence of different frequency channels. In this case, embodiments are particularly useful.

Oftentimes, networks (or communication systems) 102_1, 102_2 are arranged such that transmission signals of participants of a network (e.g. the communication system 102_2) can also be received by participants of other nearby networks (e.g. the communication system 102_1). There, they act as disturbance signals (interferences) that, in principal, may significantly decrease the performance of a radio transfer system, as is shown in FIG. 2.

Figure 2:
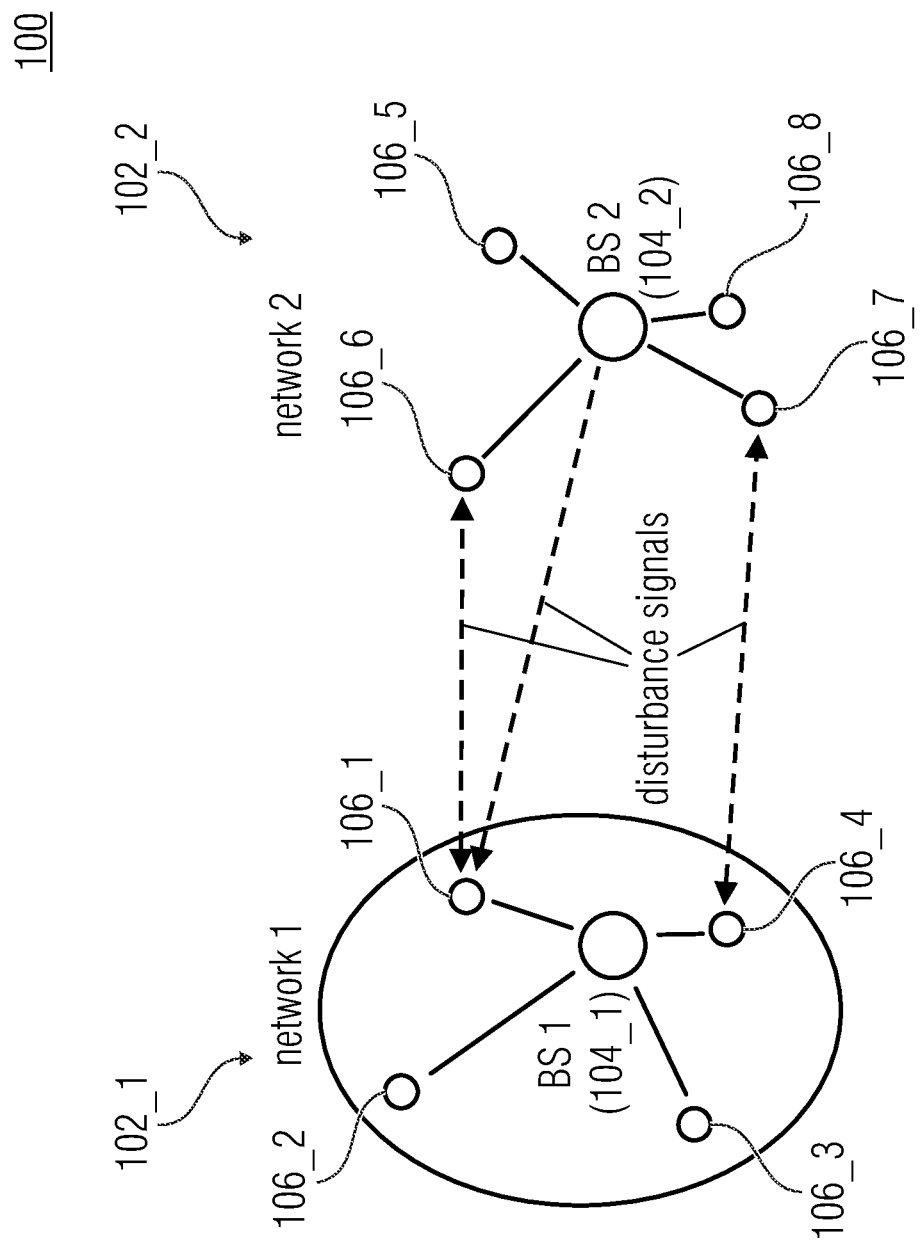
FIG. 2 shows a schematic block circuit diagram of a communication arrangement of two mutually uncoordinated networks having one base station and four associated terminal devices each, according to an embodiment of the present invention.

In detail, FIG. 2 shows a schematic view of two mutually uncoordinated networks 102_1, 102_2 with a base station (BS 1) 104_1, (BS 2) 104_2, respectively, and four associated terminal devices 106_1-106_4, 106_5-106_8, respectively. In other words, FIG. 2 shows an example network topology for two networks 102_1, 102_2 with base stations (BS 1) 104_1, (BS 2) 104_2 and four terminal devices 106_1-106_4, 106_5-106_8 each. The dashed arrows 108 exemplarily symbolize potential disturbance signals, i.e. the radio participants may receive the transmission signals of the receivers from the respectively other network as disturbance signals. Depending on the circumstances, a multitude of networks may be in a mutual reception range so that the participants (base stations or terminal devices) may be possibly exposed to a significant number of disturbers from other networks.

If (as mentioned above) the frequency band as a commonly used resource is divided into individual non-overlapping frequency channels, the effect of the disturbance signals may be significantly reduced. In mutually coordinated networks, a part of the frequency band (a set of frequency channels) may be exclusively allocated to each network so that the reciprocal disturbance (interference) may be minimized. In fully uncoordinated networks, this is not possible.

Thus, in embodiments, accessing the physical transform medium (i.e. the physical radio channel) is implemented in each network such that at least one of the following is fulfilled:
a) the channel access, i.e. the frequency occupancy and time occupancy of the radio channel, in a network has as little overlap as possible in time and frequency with the channel access in another network of the same standard (high degree of "orthogonality"),
b) the channel access has a (pseudo) random character within desired specifications (e.g. mean access frequency per time) ("randomness"),
c) as far as this is avoidable according to the specifications, there are not any longer sequences of an identical (in time and frequency) channel access between networks ("avoidance of systematic overlaps"),
d) all frequency channels within the frequency band are used as regularly as possible in order to achieve as high a frequency diversity as possible and, possibly, the adherence to official regulatory specifications ("uniform distribution of the frequency channel used"),
e) the information about the frequency occupancy and time occupancy of the radio channels, e.g. for new participants joining a network, may be transmitted with as little signaling effort as possible ("reduction of signaling information").

Simply put, in embodiments, a mutual disturbance between several networks (intern-network interference) is reduced by carrying out the channel access to the mutually used frequency band differently in frequency and time, advantageously as "orthogonal" as possible and with a (pseudo) random character.

In the following, for illustrative purposes, beside the division of the frequency band into discrete frequency channels (indices c0, c1, c2, . . . ), what is assumed to be also carried out is a temporal discretization of the accesses within a respective network. The associated temporal resources are referred to as time slots and are provided in FIG. 3 with the indices t0, t1, t2, . . . . However, both requirements (discretization in frequency and time) are not necessary prerequisites for the application of embodiments.

Figure 3:
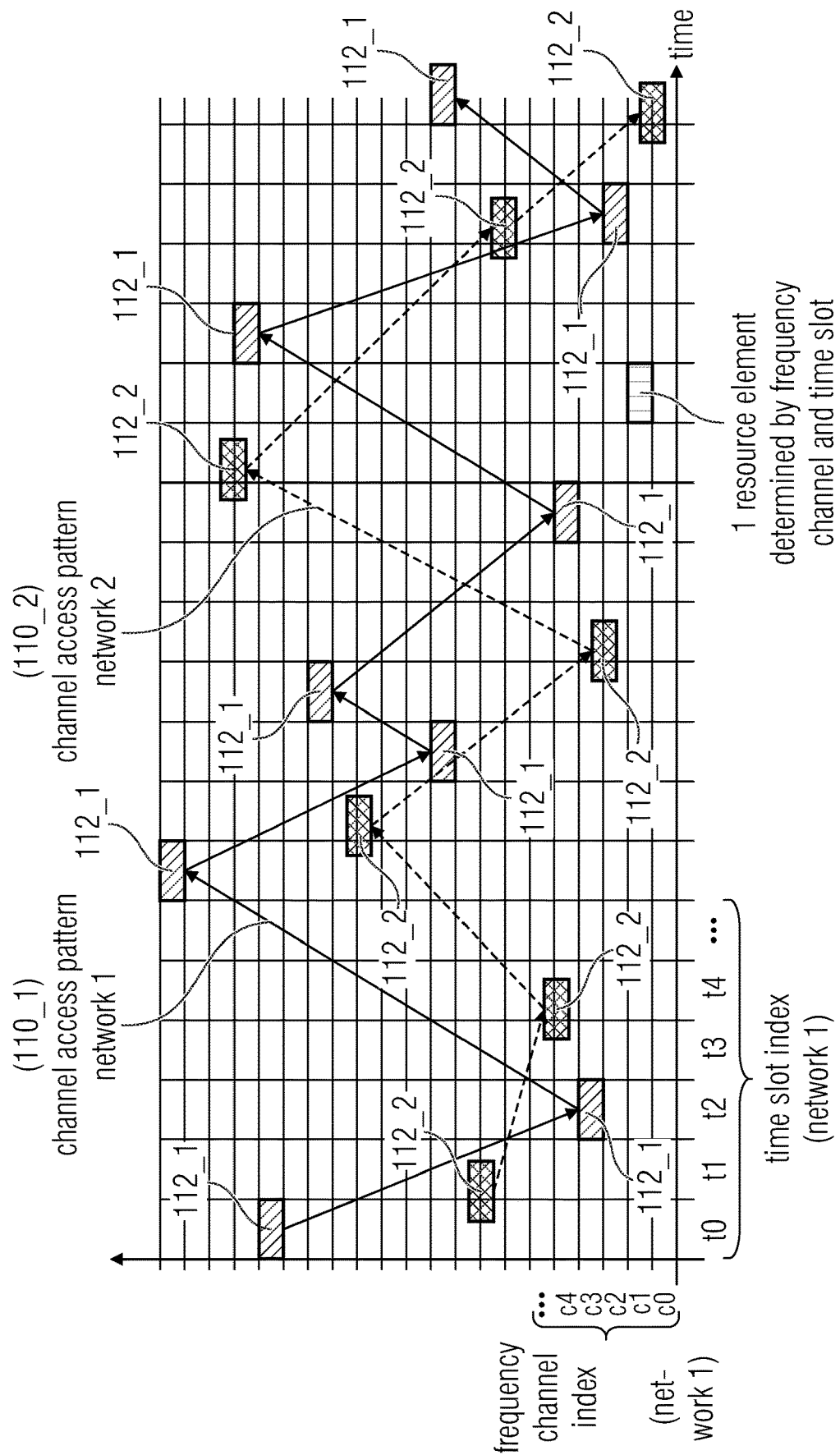
FIG. 3 shows, in a diagram, a division of the frequency band into resources and a frequency hop-based and time hop-based occupancy of the resources of the frequency band defined by two different channel access patterns, according to an embodiment of the present invention.

In detail, FIG. 3 shows, in a diagram, a division of the frequency band into resources and a frequency hop-based and time hop-based occupancy of the resources of the frequency band defined by two different channel access patterns. Here, the ordinate describes the frequency channel indices and the abscissa describes the time slot indices.

For example, the participants of the first communication system 102_1 may wirelessly communicate among themselves on the basis of the first channel access pattern 110_1, which indicates a frequency hop-based occupancy of resources of the frequency band to be used for the communication of the first communication system 102_1, whereas participants of the second communication system 102_2 wirelessly communicate among themselves on the basis of the second channel access pattern 110_2, which indicates a frequency hop-based occupancy of resources of the frequency band, usable for the communication of the second communication system 102_2, wherein the first channel access pattern and the second channel access pattern are different (e.g. comprise an overlap of less than 20%, not comprising any overlap in the ideal case).

In other words, FIG. 3 shows in grid form an overview of all fundamentally available resources in frequency and time (schematic illustration of the frequency channels and time slots and exemplary channel access patterns), wherein an individual resource element in the first communication network 102_1 is determined by allocation of a frequency channel index and a time slot index. As an example, the resources that can be occupied by the first communication network 102_1 are the resource elements indicated with the reference numeral 112_1. The set of all resources that can be occupied within a communication network represent a channel access pattern 110_1. For the first communication network 102_1, these are all resource elements indicated by the reference numeral 112_1 and connected via arrows. Equivalently, the channel access pattern of a further communication network (e.g. the second communication network 102_2) is exemplarily drawn in FIG. 3 (all resource elements indicated by reference numeral 112_2 and connected via arrows), which is not anchored in the same frequency grid and time grid as the first communication network 102_1 (resource elements are shifted in frequency and time from the base grid of the first communication system 102_1).

It is important to differentiate between
all fundamentally (maximum) available resource elements, i.e. the total quantity of all resource elements from which the channel access pattern selects an appropriate subset (e.g. all elements of the grid in FIG. 3),
all resource elements (in FIG. 3, all resource elements provided with the reference numeral 112_1) actually included into the channel access pattern, and
the quantity of resource elements (of the channel access pattern) that can actually be occupied in the network for a data transfer (e.g., with a low amount of data, only every third resource element available in the channel access pattern could actually be used).

The design of the channel access pattern therefore also means a determination of the actively usable resource supply for this communication network (or communication system).

Embodiments of base stations, terminal points, and/or communication systems using channel access patterns that fulfil at least one of the above-mentioned criteria a) to e) for communication are described in the following. In addition, embodiments of the generation of such channel access patterns are described in the following.

1. Base Station, Terminal Point and Communication System

Figure 4:
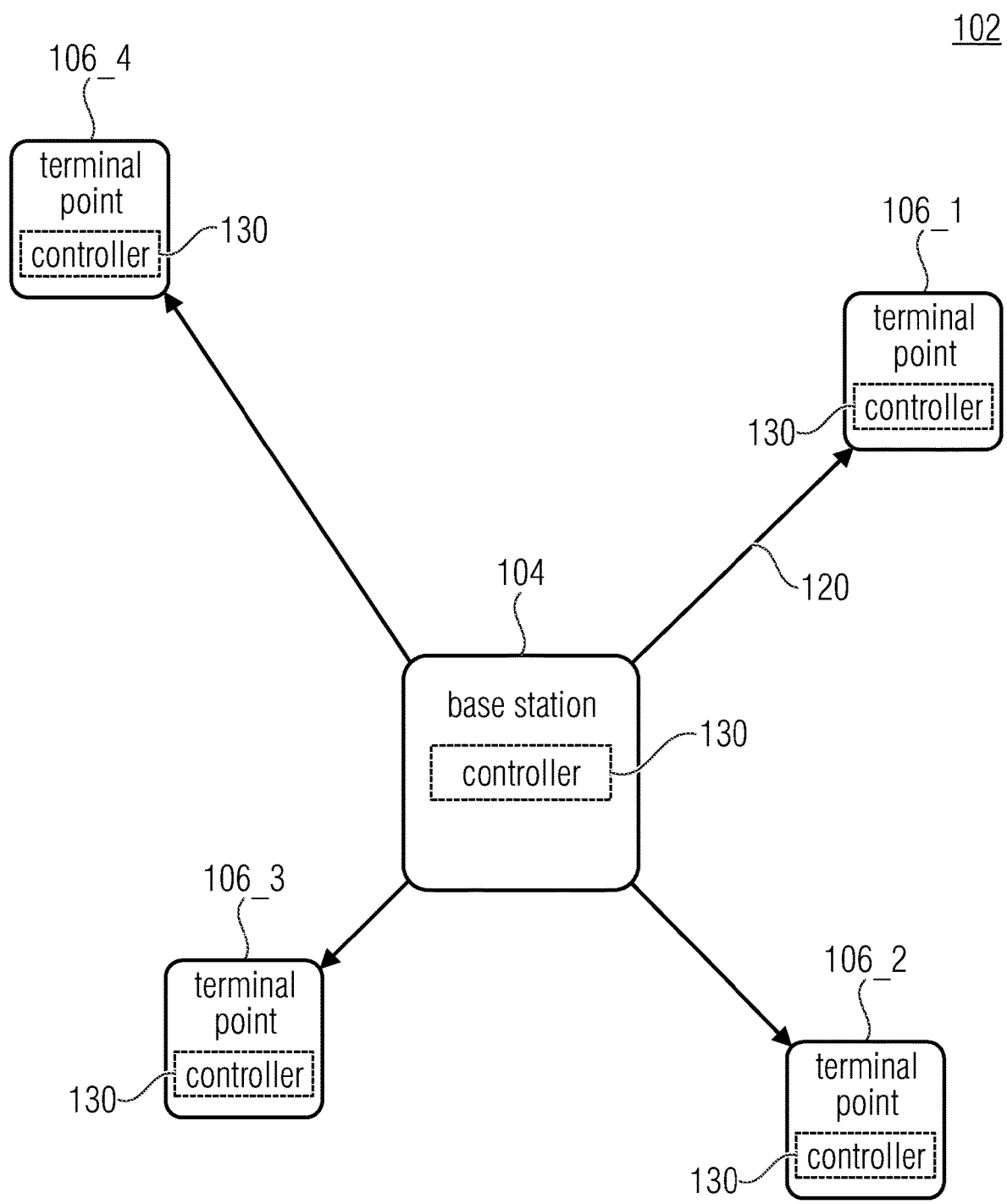
FIG. 4 shows a schematic block circuit diagram of a communication system with one base station and a plurality of terminal points, according to an embodiment of the present invention.

FIG. 4 shows a schematic block circuit diagram of a communication system 102 with one base station 104 and a plurality of terminal points 106_1-106_4, according to an embodiment.

As shown in FIG. 4 according to an embodiment, the communication system 102 may comprise one base station and four terminal points 106_1-106_4. However, the present invention is not limited to such embodiments, rather, the communication system may comprise one or several terminal points 106_1-106_$n$, wherein n is a natural number larger than or equal to one. For example, the communication system may comprise 1, 10, 100, 1000, 10,000, or even 100,000 terminal points.

The participants (=the base station 104 and terminal points 106_1-106_4) of the communication system shown in FIG. 4 use for mutual communication a frequency band (e.g. a license-free and/or permission-free frequency band such as the ISM bands) used for communication by a plurality of communication systems, as described above with reference to FIGS. 1 to 3. In this case, the communication system 102 operates in an uncoordinated manner with respect to the other communication systems that use the same frequency band.

In embodiments, the base station 104 may be configured to transmit a signal 120, wherein the signal 120 comprises information about a channel access pattern 110, wherein the channel access pattern indicates a frequency hop-based and/or time hop-based occupancy (e.g. of resources) of the frequency band, usable for the communication of the communication system 102 (e.g. a temporal sequence of frequency resources (e.g. distributed across the frequency band) usable for the communication of the communication system), wherein the information describes a state of a numerical sequence generator for generating a numerical sequence, wherein the numerical sequence determines the channel access pattern.

For example, the state of the numerical sequence generator may be an internal state of the numerical sequence generator, wherein a number of the numerical sequence may be derived from the internal state of the numerical sequence generator. On the basis of the internal state of the numerical sequence generator, internal states of the numerical sequence generator following the internal state of the numerical sequence generator may be identified, from which following numbers of the numerical sequence may also be derived. For example, the number of the numerical sequence may be directly derived from the internal state of the numerical sequence generator (e.g. state=number), e.g. in the implementation of the numerical sequence generator as a counter, or via a mapping function, e.g. in the implementation of the numerical sequence generator as a shift register, possibly with feedback.

In embodiments, at least one of the terminal points 106_1, 106_4 may be configured to receive the signal 120 with the information about the channel access pattern 110, and to identify the channel access pattern 110 on the basis of the information about the channel access pattern, wherein the information describes a state of a numerical sequence generator for generating a numerical sequence, wherein the numerical sequence determines the channel access pattern.

For example, the base station 104 and/or at least one of the terminal points 106_1-106_4 may be configured to pseudo-randomly identify the channel access pattern as a function of the state of the numerical sequence generator, e.g. by using a pseudo-random mapping function.

In addition, the base station 104 and/or at least one of the terminal points 106_1-106_4 may be configured to pseudo-randomly identify the channel access pattern as a function of individual information of the communication system (e.g. intrinsic information of the communication system such as a network-specific identifier).

Embodiments of the generation of channel access patterns are described in the following. In this case, the channel access patterns are generated by the base station 104 and may be identified by one (or all) of the terminal points 106_1-106_4 shown in FIG. 4 on the basis of the signal with the information 120 via the channel access pattern, e.g. by a controller (controlling device, controlling unit) 130 each, implemented into the base station 104 and/or into the terminal points 106_1-106_4. In this case, the specification of the channel access patterns is done (exclusively) by the base station 104, whereas the terminal points 106_1-106_4 only "know" the channel access pattern, i.e. they generate the same according to the same method as the base station 104.

The following description assumes a radio transfer system (or a communication arrangement) with several independent, mutually uncoordinated communication networks whose participants are in a mutual reception range so the transmission signals from participants of one network may potentially be considered as disturbance signals for participants of other networks. For the application of embodiments, it is not required to exchange information (data or signalization information) between different networks. Likewise, it is irrelevant whether the networks are synchronized in time and/or frequency with respect to each other.

In addition, what is assumed is that, within each network, there is a coordinating instance (in the following referred to as "base station") which may transmit to the non-coordinating participants of the network (in the following referred to as "terminal devices" or "terminal points") information about the channel access pattern applied within the network. For example, this information may be transmitted via regularly emitted beacon signals, however, it may also be transferred in irregular intervals or, possibly, in a dedicated manner to individual terminal devices or groups of terminal devises.

In addition, what is assumed is that the entire frequency band available for the transfer is divided into a multitude of individual frequency channels that may each be accessed individually or in subsets (groups of frequency channels).

Without limiting the generality and for a better illustration, the following assumes that there is a fixed, discrete time pattern within each network with which channel accesses may be carried out (cf. FIG. 3). A channel access in the form of the emission of a signal may be carried out by terminal devices as well as by the base station. However, a channel access does not necessarily have to be carried out in a resource provided to this end in the channel access pattern, e.g., if there is no data or other information to be transferred.

Figure 5:
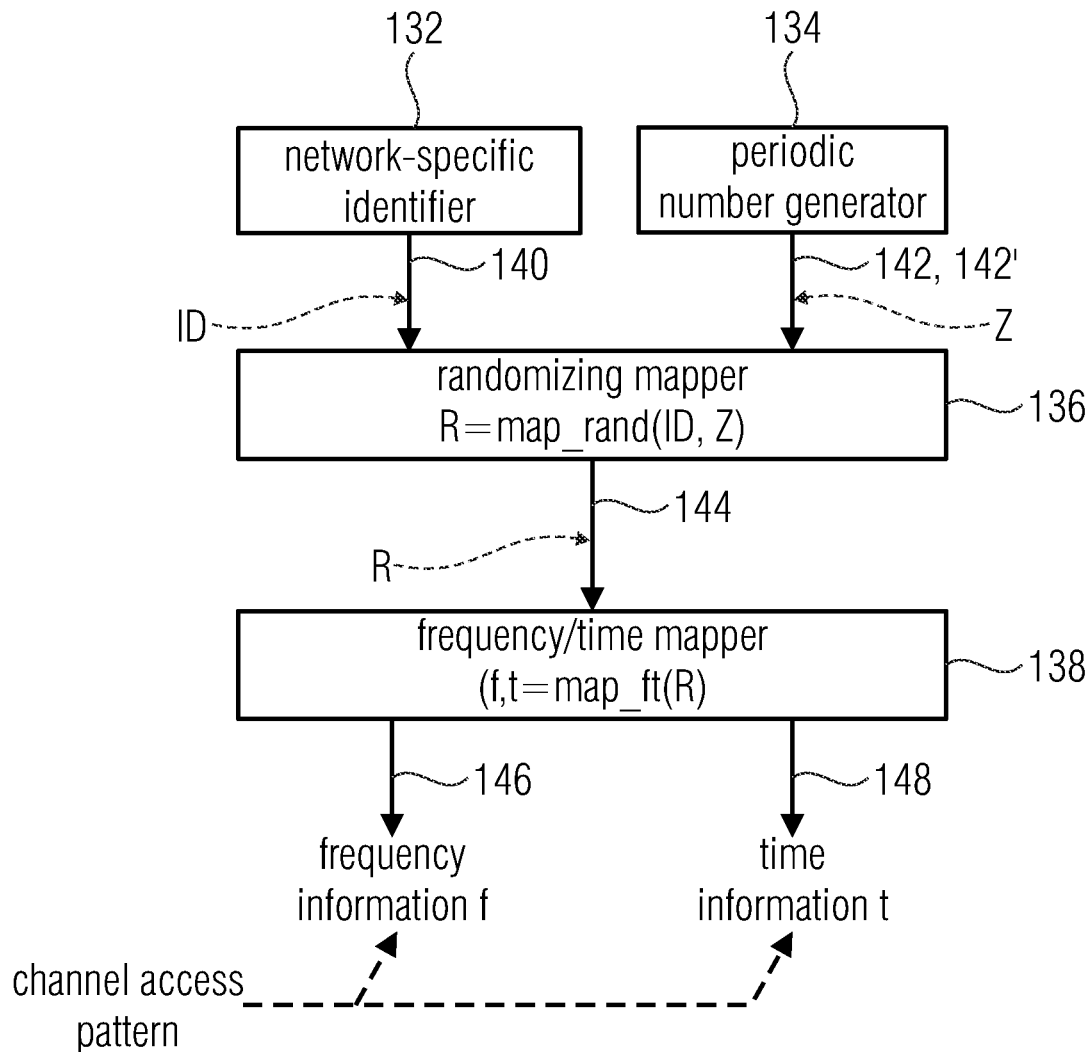
FIG. 5 shows a schematic block circuit diagram of a controller for generating a channel access pattern, according to an embodiment of the present invention.

FIG. 5 shows a schematic block circuit diagram of a controller 130 for generating a channel access pattern, according to an embodiment of the present invention.

As can be seen in FIG. 5, the controller 130 may comprise a memory 132, a periodic numerical sequence generator 134 for generating a periodic numerical sequence Z, a randomizing mapper 136 and a frequency/time mapper 138.

The memory (e.g. a register) 132 may be configured to store a network-specific identifier ID 140, e.g. a (individual) bit sequence that does not change. The periodic numerical sequence generator 134 may be configured to provide its state 142 or a number 142' of the periodic numerical sequence derived from its state. The randomizing mapper 136 may be configured to identify a pseudo random number R 144 as a function of the state 142 of the numerical sequence generator 134 or the number 142' of the periodic numerical sequence derived therefrom and the network-specific identifier ID 140. The frequency/time mapper 138 may be configured to identify frequency information f 146 and time information t 148 on the basis of the pseudo random number R 144. For example, the frequency information f 146 and the time information t 148 may describe, or define, a frequency channel and a time slot (or a frequency channel index and a time slot index) and therefore a resource of the channel access pattern.

For example—as is indicated in FIG. 4—the controller 130 may be implemented in the base station 104 and/or in the one or several terminal point(s) 106_1-106_4 so as to calculate the individual (or network-individual) channel access pattern used by the communication system 102.

In other words, FIG. 5 shows the base structure for the generation of channel access patterns according to an embodiment of the present invention.

The generation of the channel access patterns is done iteratively, i.e. the blocks illustrated in FIG. 5 are called up once per generation of a single piece of channel access information. By a call-up of N-times, a channel access pattern with N channel accesses is generated.

The function of the partial blocks is described in detail in the following. The term "number" is used. This is generally discrete information that may be present in different forms (e.g. in decimal form, as a binary sequence, or the like).

Network-Specific Identifier "ID"

The network-specific identifier is a fixed number that is determined by an external instance (e.g. when configuring the network, or the coordinating base station). Ideally, it differs from network to network. For example, it may be an unambiguous, sufficiently long base station ID, unambiguous network ID, or a sufficiently long hash about them, respectively. This variable is fixed and is the only one that does not vary from call-up to call-up in the arrangement shown.

Periodic Number Generator "Z"

The periodic number generator 134 generates a sequence of numbers Z that periodically repeats with the periodicity P. It has an internal state $S_n$ from which the next generated number and the next internal state $S_{n+1}$ can be unambiguously determined. The significant feature is that the entire periodic sequence for each time step may be derived from a single internal state (which is present in an arbitrary time step) already. For example, a simple embodiment is a modulo P counter that periodically delivers the numerical sequence 0,1,2 . . . (P−1). A further embodiment is a deterministic random number generator (pseudo random number generator), e.g. implemented in the form of a feedback shift register (LFSR). A third embodiment is a finite body (Galois field) with P elements.

Randomizing Mapper

The randomizing mapper 136 generates from the two input numbers ID and Z an output number R, i.e. R=map_rand(ID, Z) wherein map_rand represents the mapping function. In this case, the mapping has as random a character as possible, i.e. a mathematically correlated input sequence (consisting of ID, Z) generates an output sequence R that is as uncorrelated in itself as possible.

Embodiments for a randomizing mapping are:
linking the two input numbers
applying a cyclic redundancy check (CRC) on the input qualities ID, Z, which leads to the number R and has a randomizing character,
applying a hash function
applying an encryption, e.g. AES encryption, wherein the associated key is known to all authorized participants, and which therefore also represents a method for embedding a "transport layer security" (TLS).

According to the above, the sequence of the elements of the number R is of a pseudo-random nature. It should be different from network to network so as to avoid overlaps of the channel access patterns.

Frequency/Time Mapper

The frequency/time mapper 138 maps, by means of a mapping, to each input number R a 2-tupal of frequency information (radio frequency f) and time information (access time t), i.e. (f,t)=map_ft(R), wherein "map_ft" represents the mapping function. While, in principle, the sequence of the frequencies may be arbitrary within the specified frequency band, the points in time may be present in a monotonously increasing form from call-up to call-up, since "returns" in time are not admissible.

As an embodiment, what is a of particular importance is the case in which the channel access is discretized in time/frequency direction (as described above), i.e. is done in the form of discrete frequency channels and discrete time slots. In this case, the frequency/time mapper allocates to each input number R a 2-tuple of frequency channel index fi and time slot index ti, i.e. (fi,ti)=map_ft(R). The time slots are indexed in a temporally ascending order, since "returns" in time are not admissible. Further discussions as to the occupancy of the time slots can be found in section 3.

The sequence of the 2-tuple (f,t), or (fi, ti), is based on the sequence of the elements of R and defines the channel access pattern.

The exact implementation of the frequency/time mapper, together with the probability function of the number R, determines the access statistic with respect to the channel.

State Signaling and Predictability

The arrangement shown in FIG. 5 generates a channel access pattern that depends both on a temporally invariable network-specific identifier and on a state-dependent (and therefore temporally variable) periodic number generator (periodicity P). By means of the network-specific identifier, it can be ensured that networks with different network-specific identifiers generate different sequences of R, even if their number generator were to be in the same state. This can ensure that different networks do not generate any identical channel access patterns and therefore, in the worst case, get into a "continuous collision" of the channel accesses.

In order to identify the channel access pattern used in the network, a terminal device needs the network-specific identifier and the respective state of the periodic number generator.

The network-specific identifier is obtained by the terminal device already at the initial log-on at the network. Advantageously, the same is transferred by means of beacon signals regularly emitted by the base station, and is made available to all authorized terminal devices. Alternatively, the network-specific identifier may also be made known to the terminal device in the course of the initial configuration (with delivery), i.e. before the first operation in the network.

The state of the periodic number generator may either be transferred in a regular beacon signal and/or in distinct dedicated state-signaling resources. A number generator with a periodicity P has P internal states so that $\lceil \log_2 \rceil$ bits are transferred for the transmission of the respective state.

The amount of information (number of bits) transferred per state signaling may therefore be controlled by the selected periodicity of the number generator according to the requirements.

The information transferred for the state signaling may be transferred in the form of several pieces of partial information, wherein the transfer may be carried out with different frequencies. Thus, as an embodiment for the case that the periodic number generator (Z) is a counter, the higher-valued bits (most significant bits (MSBs)) of the counter could be transferred separated from the lower-valued bits (least significant bits (LSBs)), and also with different frequencies (e.g. more infrequently). Even if it is not a counter, the entire state information could be transferred in the form of several pieces of partial state information with different transfer frequencies.

Through the periodicity of the number generator, a terminal device that knows the state of the number generator at least at one point in time may determine the entire channel access pattern for any points in time/time slots in the future. This enables the terminal device in an energy-saving idle state to deactivate, e.g., the transmission/reception unit and to predetermine the then valid portion of the channel access pattern from the last previously known state when the transmission/reception unit is subsequently activated. An emission of the state information by the base station may therefore be done in comparatively large temporal intervals.

In summary, the method described herein has the advantage that a comparatively large state space for the (pseudo-random) number R is covered through the combination of a network-specific identifier and a periodic numeric generator. This prevents the channel access patterns of networks to be identical with different network-specified identifiers, which may minimize a systematic collision of the channel accesses of different mutually uncoordinated networks. This proves to be particularly advantageous for the telegram splitting multiple access (TSMA) method.

Advantageous features of the frequency/time mapper are discussed in more detail in the following sections.

Further Embodiment of the Controller

According to FIG. 5 and the above description, a periodic number generator 134 is a requirement. In the following embodiment, it is replaced as follows.

Real radio networks are often operated with a beacon signal that is emitted regularly. In this case, each beacon emission may be provided with a counter that corresponds to a beacon sequence index. Here, this beacon sequence index is referred to as "beacon index".

It is also common practice for the time slots in a time slot-based system to be provided with a time slot index counter (that increases in the time direction) (cf. FIG. 3). Here, this is referred to as "time slot index". The beacon index is reset to zero in certain intervals specified in the system so that it has a periodicity. The same applies to the time slot index (e.g. which restarts at zero after a beacon emission).

Figure 6:
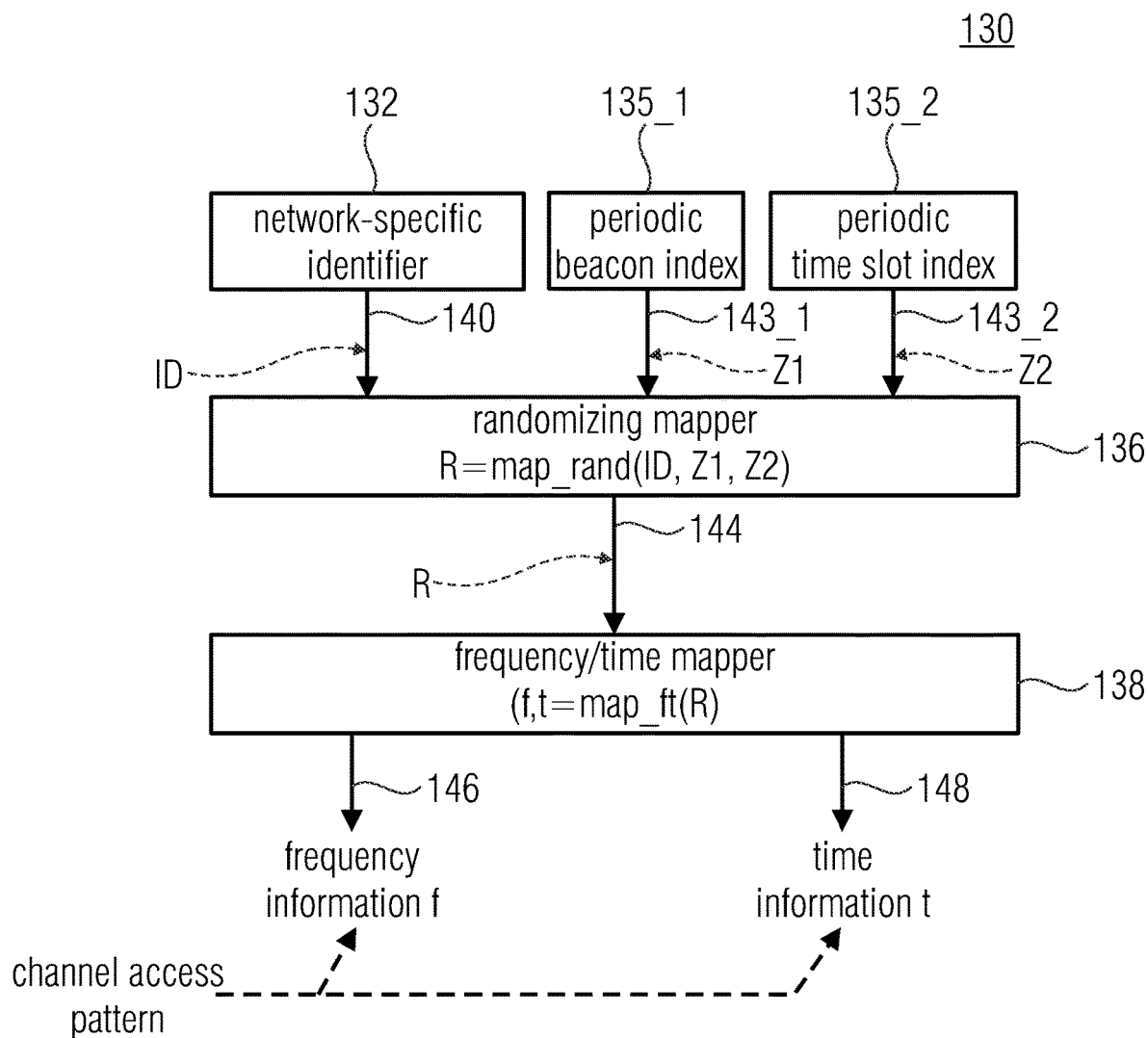
FIG. 6 shows a schematic block circuit diagram of a controller for generating a channel access pattern, according to a further embodiment of the present invention.

FIG. 6 shows a schematic block circuit diagram of a controller 130 for generating a channel access pattern, according to an embodiment of the present invention.

The controller 130 may comprise a memory 132, a first buffer 135_1, a second buffer 135_2, a randomizing mapper 136 and a frequency/time mapper 138.

The memory (e.g. a register) 132 may be configured to store a network-specific identifier ID 140, e.g. a (individual) bit sequence that is invariable. The first buffer (e.g. a register) 135_1 may be configured to store a periodic beacon index Z1 143_1. The second buffer (e.g. a register) 135_2 may be configured to store a periodic time slot index Z2 143_2. The randomizing mapper 136 may be configured to identify a pseudo-random number R 144 as a function of the periodic beacon index Z1 143_1, the periodic time slot index Z2 143_2 and the network-specific identifier ID 140. The frequency/time mapper 138 may be configured to identify frequency information f 146 and time information t 148 on the basis of the pseudo-random number R 144. For example, the frequency information f 146 and the time information t 148 may describe, or define, a frequency channel and a time slot (or a frequency channel index and a time slot index) and therefore a resource of the channel access pattern.

In other words, FIG. 6 shows a modified base structure for generating channel access patterns with a beacon index and a time slot index. FIG. 6 illustrates an embodiment in which, compared to the embodiment shown in FIG. 5, the periodic number generator (output Z) 134 is replaced by the two blocks "periodic beacon index" (output Z1) 135_1 and "periodic time slot index" (output Z2) 135_2. All further blocks are unchanged in function (the randomizing mapper now has three inputs).

The controllers 130 shown in FIGS. 5 and 6 enable the generation of network-individual channel access patterns, comprising at least one of the following characteristics:
the channel access patterns contain amongst themselves as few overlapping partial sequences as possible,
there is a large supply of channel access patterns (e.g. in areas with a high network density),
the channel access patterns are designed such that they have a very high periodicity,
the channel access patterns lead (if there are corresponding requirements) to an use of the available frequency channels that is uniform on average,
signaling of the applied pattern is done by the coordinating instance with as little signaling information as possible, and
terminal devices may already determine the content of the access pattern at any future time when the signaling of the channel access is received once and completely (this enables terminal devices, e.g. for energy saving reasons, to introduce longer reception pauses and to determine the valid channel access pattern on the basis of information received before the reception pause, when being switched on again.

2. Control of the Channel Access in the Frequency Domain

To simplify the following illustration, what is assumed is that the frequency range (or the frequency band) is divided into discrete frequency channels and that a transfer is carried out according to the TSMA method.

Mobile radio channels usually comprise signal attenuation that varies across the frequency. If a data packet is transferred in the form of several partial data packets according to the TSMA method and if the underlying mobile radio channel is not known in the transmitter, the error rate of the transfer may be reduced or even minimized on average by transferring the individual partial data packets as distributed across the entire frequency domain as possible (using the frequency diversity).

For this reason, it may be advantageous (in particular if a data packet consists of only a few partial data packets) to ensure that the frequency channels on which the partial data packets are transferred have a certain (minimum) distance relative to each other in the frequency domain.

Since the channel access pattern significantly determines the frequency hopping behavior in TSMA within a network, a suitable method may be used to ensure that there is a minimum distance between two consecutive frequency channels of the channel access pattern.

Thus, in embodiments, the frequency/time mapper 138 (cf. FIG. 5 or 6) may be configured to determine frequency information f and time information t on the basis of the pseudo-random number R, wherein the frequency information f indicates a distance between two consecutive frequency channels.

Thus, the frequency/time mapper 138 in FIG. 5 or 6, which determines absolute frequency channels independently from access to access on the basis of the pseudo-random number R, may alternatively also determine distances between two consecutive frequency channels.

Figure 7:
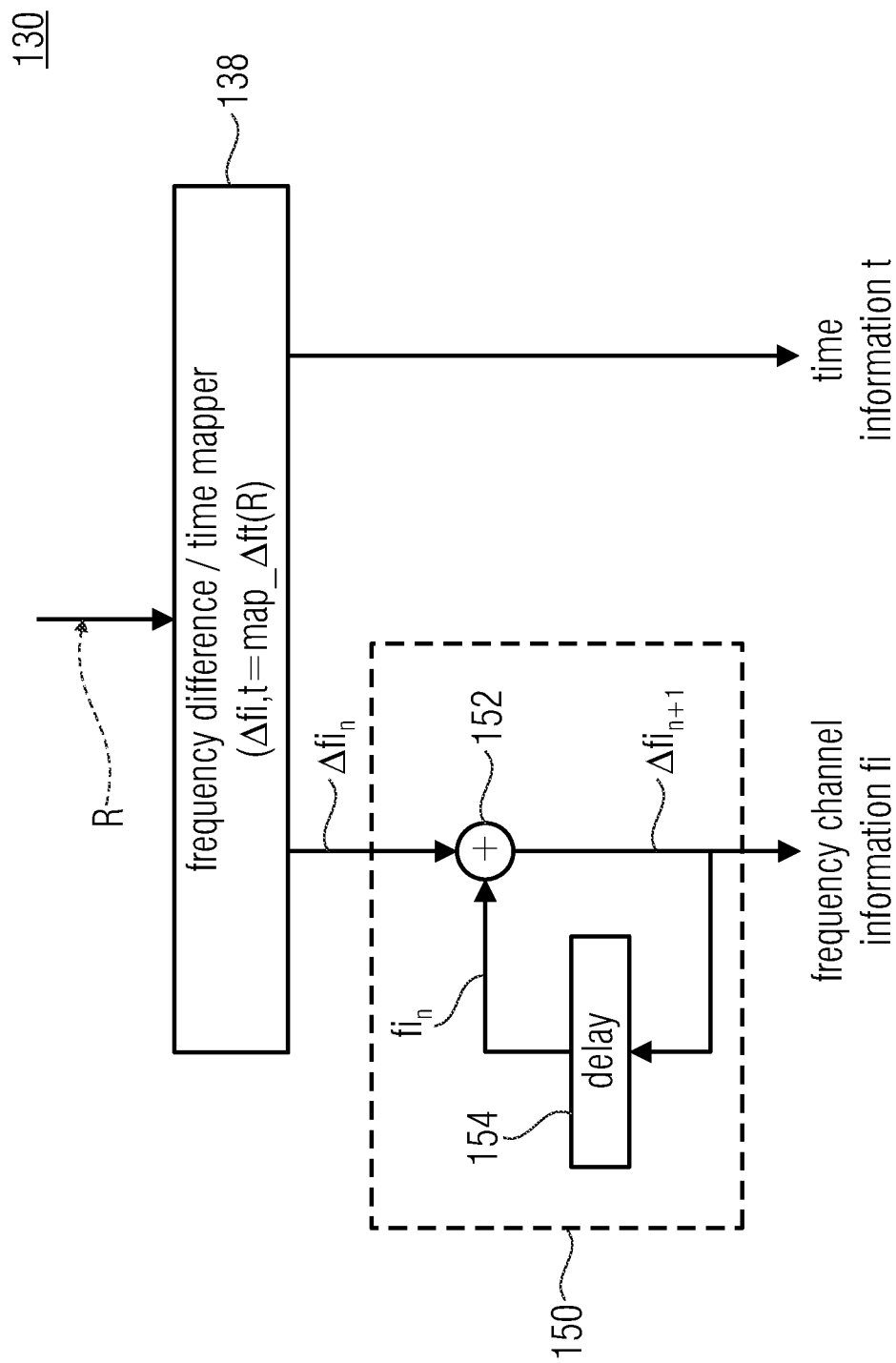
FIG. 7 shows a schematic block circuit diagram of a section of the controller, according to an embodiment of the present invention.

FIG. 7 shows a schematic block circuit diagram of a section of the controller 130, according to an embodiment. As can be seen in FIG. 7, the frequency/time mapper 138 (cf.

FIG. 5 or 6) may be configured to determine frequency information and time information on the basis of the pseudo-random number R, wherein the frequency information indicates a distance $\Delta fi_n$ between two consecutive frequency channels.

As can further be seen in FIG. 7, the controller 130 may comprise a mapper 150 configured to map the distance $\Delta fi_n$ between two consecutive frequency channels onto a frequency channel index fi, e.g. by means of a combiner (e.g. adder) 152 and a delay element 154.

In other words, FIG. 7 shows the generation of frequency hops with minimum and/or maximum hop widths. FIG. 7 illustrates that the frequency/time mapper 138 of FIG. 5 or 6 is now replaced by a frequency difference/time mapper 138 that no longer provides absolute frequency channel indices at its immediate output, but frequency channel index differences.

By means of a suitable mapping function ($\Delta fi,t$)=map_$\Delta ft$ (R) in the frequency difference/time mapper, it may be ensured that only frequency channel index hops $\Delta fi_n$=$fi_{n+1}$−$fi_n$ (from channel access n to channel access n+1) are carried out, e.g., that are within a desired range, e.g. $\Delta fi_{max} \geq \Delta fi \geq \Delta fi_{min}$ for $\Delta fi>0$ and $\Delta fi_{max} \geq (-\Delta fi) \geq \Delta fi_{min}$ for $\Delta fi<0$. There are numerous methods for the implementation of such a limitation, which are not subject of the invention. An exemplary implementation in the form of a corresponding program code for MATLAB (which was used to generate FIG. 8) can be found in the appendix.

Figure 8:
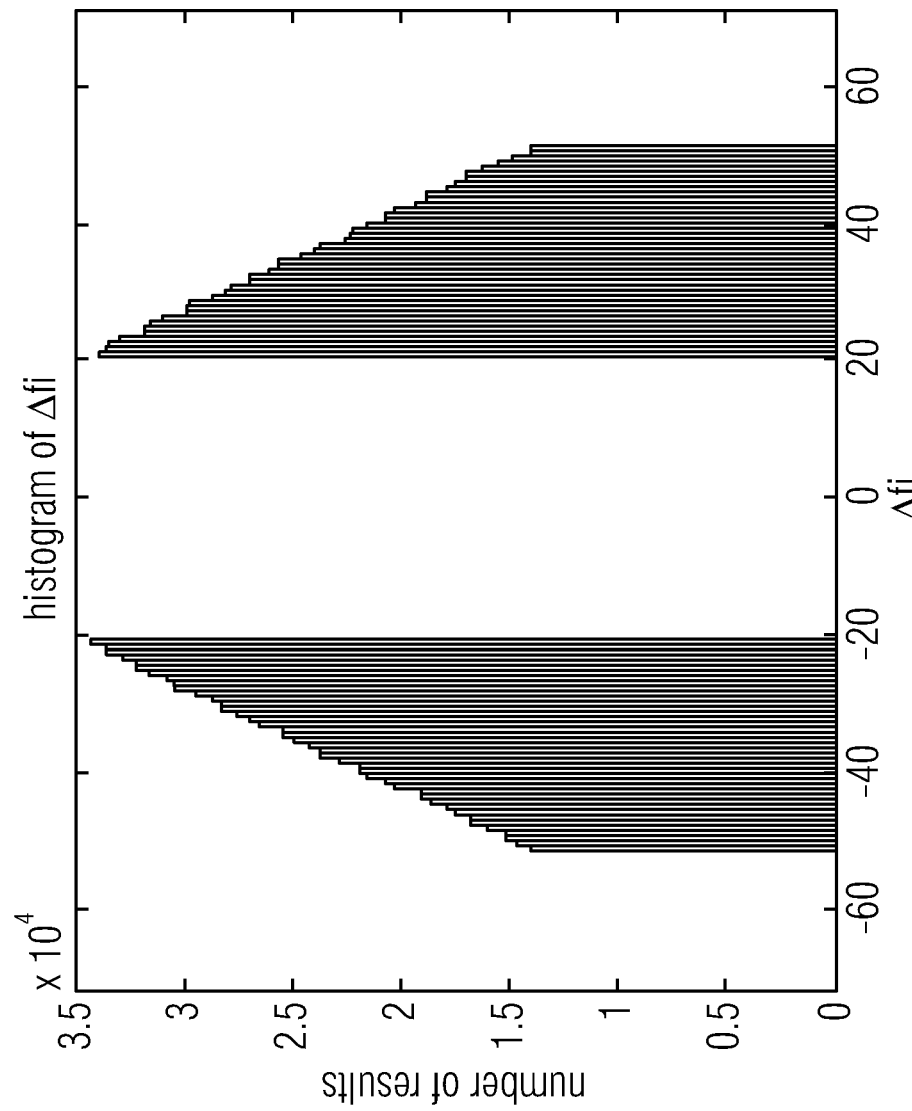
FIG. 8 shows, in a diagram, a Monte Carlo simulation-based histogram about the variable $\Delta fi$.

FIG. 8 shows, in a diagram, a Monte Carlo simulation-based histogram about the variable $\Delta fi$ (the difference of the frequency channel index $\Delta fi$ between temporally adjacent channel accesses).

72 frequency channels are available in the illustrated example. The parameters associated with the simulation results are $\Delta fi_{min}$=21, $\Delta fi_{max}$=51, i.e. the size of the distance between two accesses that are consecutive in the channel access pattern is between 21 and 51 frequency channels.

By suitable modifications of the exemplary program code, which are easily accessible to the person skilled in the art, other distribution forms than those shown in FIG. 8 can be generated for $\Delta fi$ (e.g. equal distribution in the range from $-\Delta fi_{min}$ to $-\Delta fi_{max}$, or $+\Delta fi_{min}$ to $+\Delta fi_{max}$).

3. Specification of the Temporal Channel Access Activity

In a highly utilized system, all available time slots may be included in the channel access pattern. In less utilized systems, not every time slot needs to be available for the channel access. This is illustrated in the following illustration.

Figure 9:
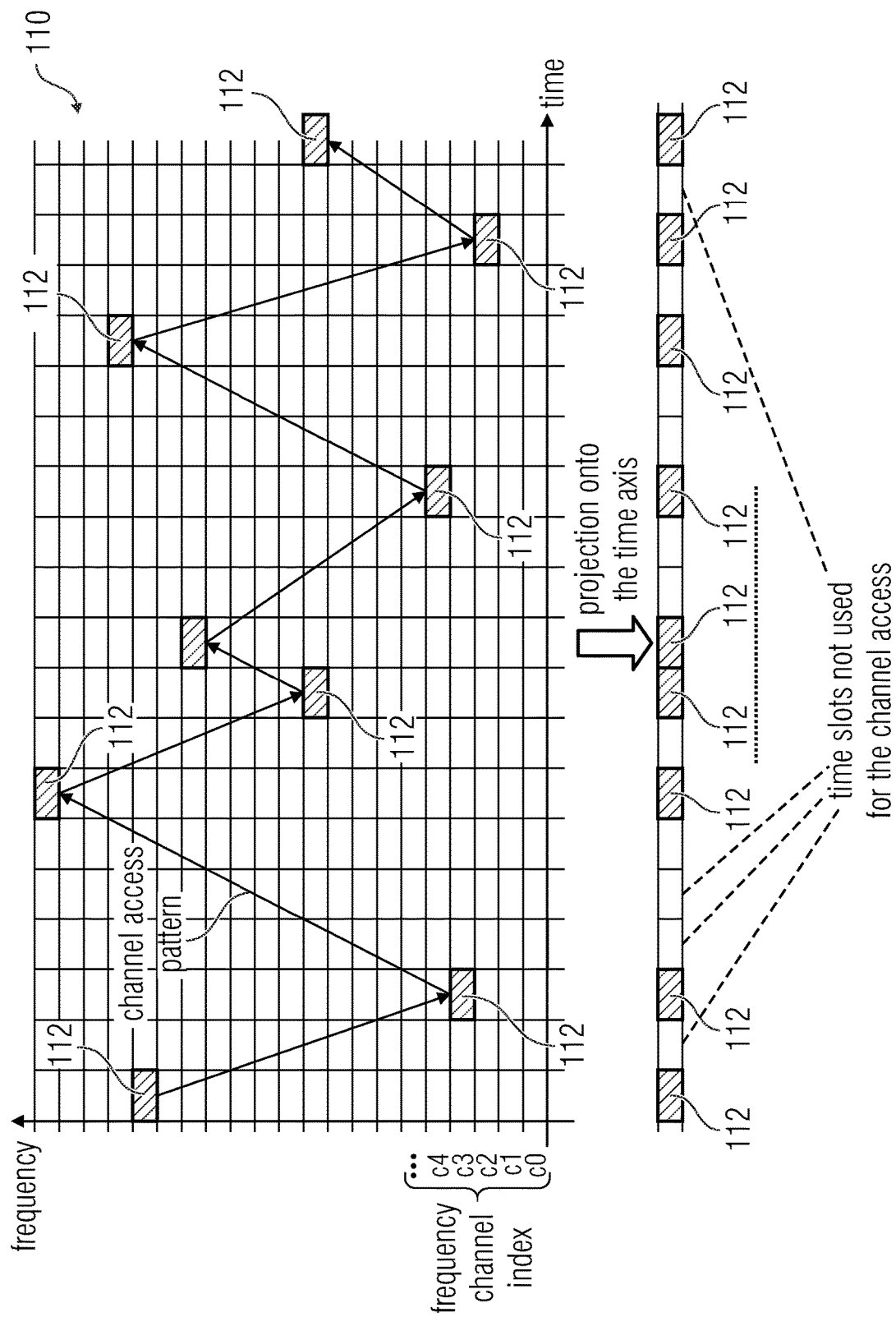
FIG. 9 shows, in a diagram, a frequency hop-based and time hop-based occupancy of the resources of the frequency band defined by a channel access pattern and a projection of the channel access pattern onto a time axis, according to an embodiment of the present invention.

FIG. 9 shows, in a diagram, a frequency hop-based and time hop-based occupancy of the resources 112 of the frequency band defined by a channel access pattern 110 and a projection of the channel access pattern 110 onto a time axis, according to an embodiment of the present invention. Here, the ordinate describes the frequency channel indices and the abscissa describes the time slot indices.

In other words, FIG. 9 exemplarily shows at its top a channel access pattern 110 in the dimensions frequency and time (resource elements 112), and shows at its bottom its projection onto the time dimension. What can be is seen is that not every time slot is part of the channel access pattern 110.

Thus, to generate a pseudo-random channel access pattern 110, the dimension time (in the form of the time slot index) is available in addition to the dimension frequency (in the form of the frequency channel index. Thus, when generating a channel access pattern, a mean activity rate A may be specified. Here, this activity rate is defined as a mean ratio of time slots used for the channel access to maximum available time slots. Thus, the activity rate A is 1 (100%) when using every time slot. However, if only every third time slot is included in the channel access pattern on average, the mean activity rate A=⅓.

Thus, the activity rate determines the (temporal) density of the resources 112 offered in the channel access pattern 110.

In embodiments, the time slots selected for the channel access at a specified activity rate may be determined in a pseudo-random manner from a suitable part of the pseudo-random number R (cf. FIG. 5 or 6).

Embodiment 1

In each step n, an integer number $r_n$ may be derived from the associated pseudo random number $R_n$, which may adopt the values between $r_{min}$ and $r_{max}$, i.e., $r_{min} \leq r_n \leq r_{max}$. After every time slot that is active in the channel access pattern 110, a number of $r_n$ time slots may be skipped, thus, they are not used for the channel access. This process is exemplarily illustrated in FIG. 10.

Figure 10:
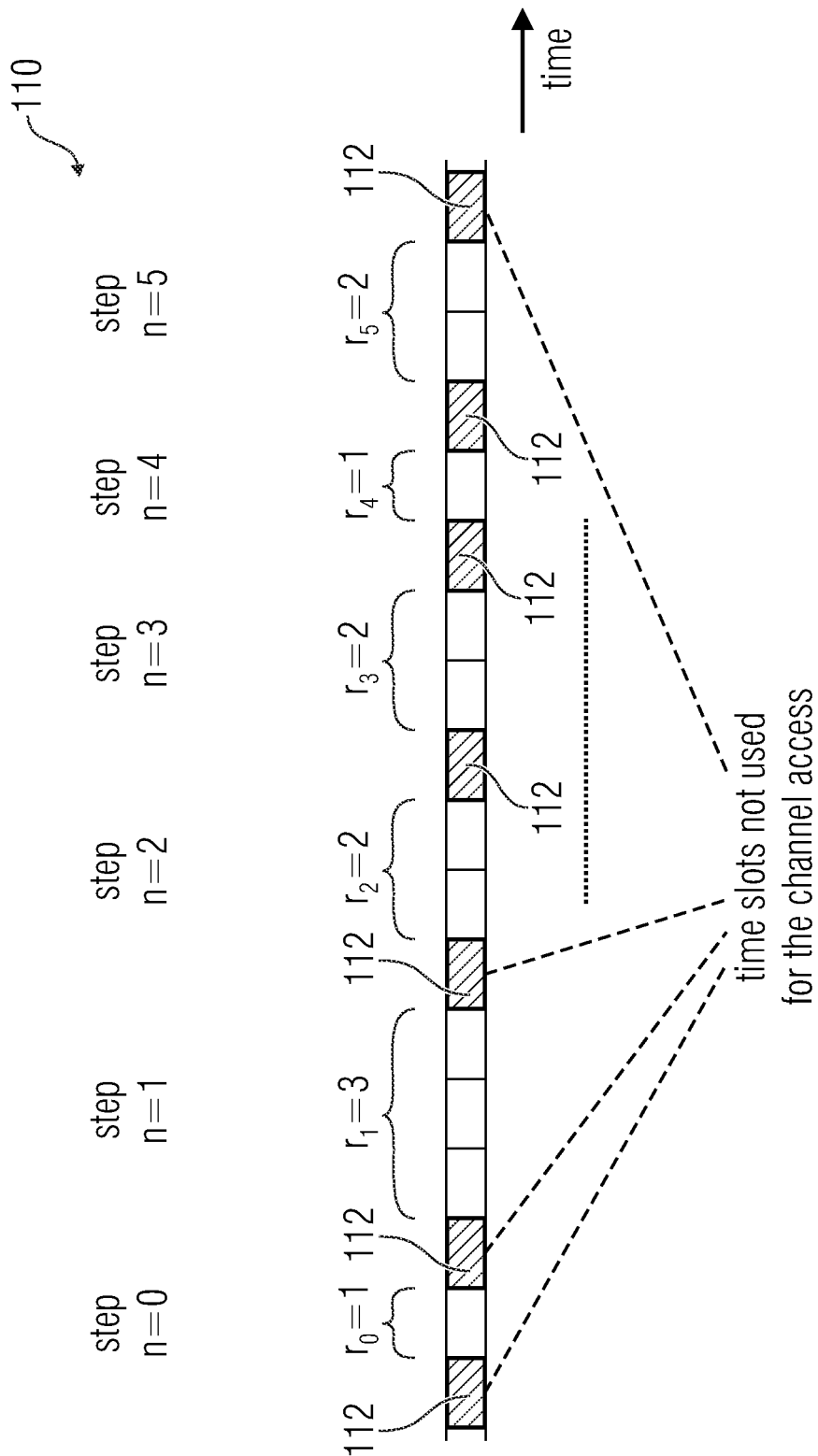
FIG. 10 shows, in a diagram, resource elements of a channel access pattern projected onto a time axis, resulting in unused time slots, according to an embodiment of the present invention.

In detail, FIG. 10 shows, in a diagram, resource elements 112 of a channel access pattern 110 projected onto a time access, resulting in unused time slots, according to an embodiment.

In other words, FIG. 10 shows an exemplary sequence of used and unused time slots, according to an embodiment.

If the number r is derived from the number R such that the elements of r occur with the same frequency between $r_{min}$ and $r_{max}$ (equal distribution), the following activity rate results:

$$A=2/(2+r_{min}+r_{max}).$$

The method presented in the above embodiment has the advantage that minimum and maximum distances between the time slots active in the channel access pattern 110 may be specified. Specifying minimum distances may be particularly advantageous for battery-powered devices, where transmission pauses of a certain minimum length between two consecutive emissions (recovery phase) increase the battery life.

A comparable approach, what can be specified is that a minimum number of active time slots directly follow each other.

Embodiment 2

In an implementation according to embodiment 1, what may occur are longer regions having locally significantly higher or lower activity rates than desired. This effect is avoided in the following embodiment.

Figure 11:
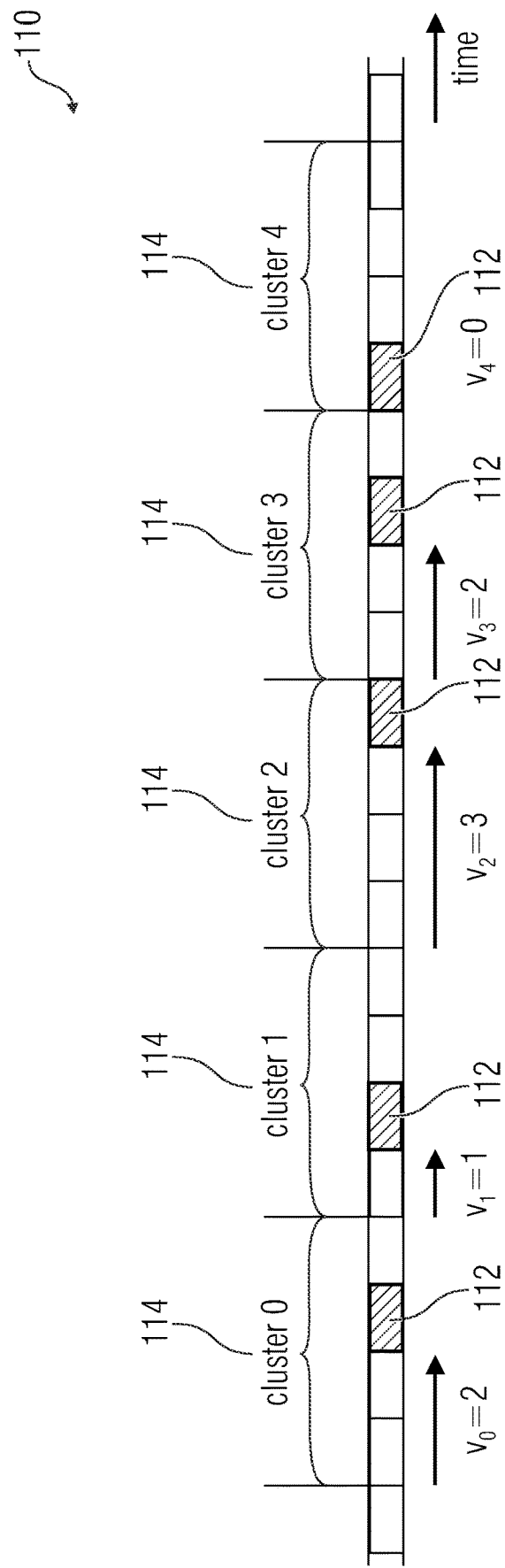
FIG. 11 shows, in a diagram, resource elements of a channel access pattern projected onto a time axis, with an activity rate $A=\frac{1}{4}$, according to an embodiment of the present invention.

Here, groups of consecutive time slots in which one active time slot of the channel access pattern each is placed are periodically specified. In FIG. 11, this is exemplarily illustrated for an activity rate of ¼ (25%).

In detail, FIG. 11 shows, in a diagram, resource elements 112 of a channel access pattern 110 projected onto a time access, with an activity rate A=¼, according to an embodiment.

In other words, FIG. 11 shows an exemplary sequence of used and unused time slots, according to an embodiment.

As can be seen in FIG. 11, the time slots may be grouped into clusters 114 (having the length of 4 in the example of FIG. 11). Exactly one time slot of the channel access pattern 110 is placed into each cluster 114. The position of the time slots included in the channel access pattern 110 within the cluster 114 may be determined by a displacement $v_n$ that may be derived from the pseudo random number $R_n$ and may adopt integer numbers between 0 and (cluster length−1).

If a minimum distance between two consecutive time slots of the channel access pattern 110 is to be ensured, non-occupiable regions may be introduced between the clusters 114. They may consist of one or several time slots, as is illustrated in FIG. 12.

Figure 12:
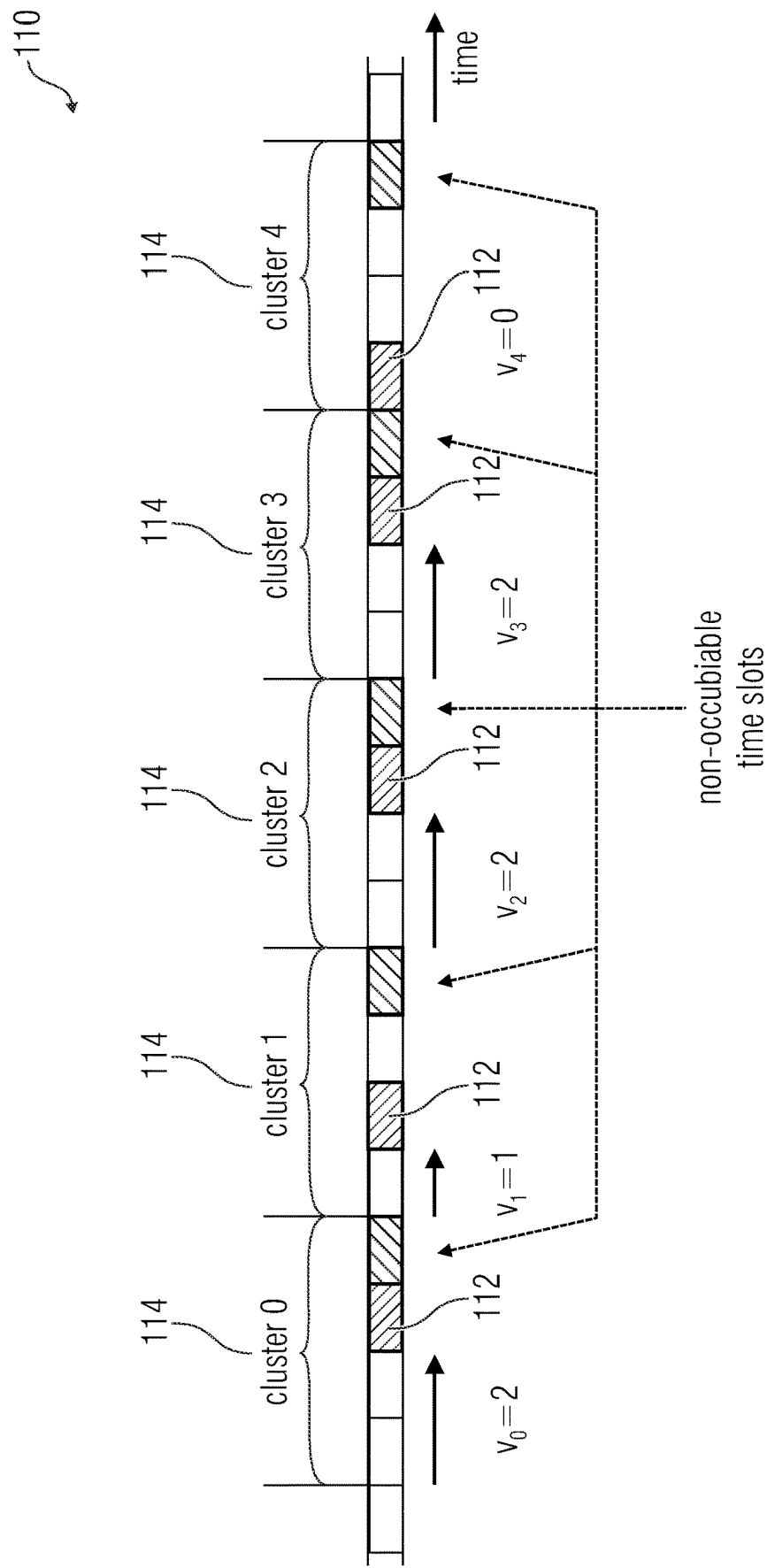
FIG. 12 shows, in a diagram, resource elements of a channel access pattern projected onto a time axis, with an activity rate $A=\frac{1}{4}$ and a specified minimum distance between consecutive time slots of the channel access pattern, according to the embodiment of the present invention.

In detail, FIG. 12 shows, in a diagram, resource elements 112 projected onto a time access of a channel access pattern 110, with an activity rate A=¼ and a specified minimum distance between consecutive time slots of the channel access pattern 110, according to an embodiment.

In other words, FIG. 12 shows an exemplary sequence of used and unused time slots with non-occupiable time slots, according to an embodiment.

As can be seen in FIG. 12, due to the non-occupiable time slots, the admissible range of the displacement variable $v_n$ is decreased to the value range of 0 to (cluster length−1−length of the non-occupiable region).

Depending on the selected activity rate, the clusters 114 may have to comprise different lengths in order to achieve the desired activity rate. In this case, the value range of $v_n$ varies according to the respective cluster length. For example, in order to set an activity rate of 40%, clusters of the length of two and the length of three may alternate.

4. Channel Access Pattern with Regions of Different Activity Rates

Data packets that are to reach the receiver as quickly as possible (short latency time) involve channel accesses that follow each other as closely as possible during transfer, i.e. a comparatively high activity rate in the channel access pattern.

On the other hand, for data packets where a transmission reliability (e.g. high robustness against external disturbance) is of primary importance, a distribution of the emission over a longer period of time can be advantageous, i.e. a comparatively low activity rate in the channel access pattern can be favorable. The same applies to devices where a temporally equalized energy extraction from the battery (temporally stretched transmission activity) is desired.

As illustrated above, the activity rate, i.e. the frequency of the channel access, may be specified by suitable measures. In order to satisfy the different requirements in a network, if any, a channel access pattern may be designed such that it comprises regions with different activity rates. This is exemplarily illustrated in FIG. 13. Depending on the individual requirement, terminal devices may then transmit in the region suitable for them, for example.

Figure 13:
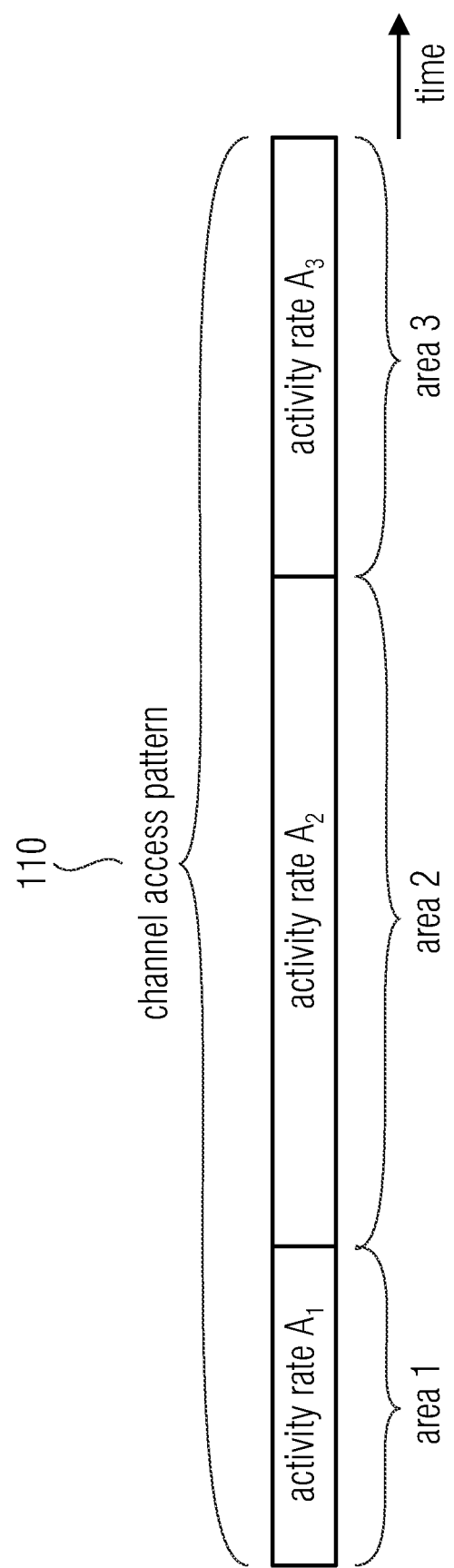
FIG. 13 shows a temporal distribution of a channel access pattern 110 into regions of different activity rates A1, A2, and A3, according to an embodiment of the present invention.

In detail, FIG. 13 shows a temporal distribution of a channel access pattern 110 into regions of different activity rates $A_1$, $A_2$, and $A_3$, according to an embodiment.

In other words, FIG. 13 shows an example of a channel access pattern with three regions of different activity rates within the channel access pattern 110.

5. Demand-Dependent (Dynamic) Adaption of the Activity Rate of the Channel Access Pattern In networks (or communication systems) 102, different utilization situations may exist at different times. As explained above, the actively usable resource supply for this network may be determined by the design of the channel access pattern 110 (i.e. its activity rate or mean temporal density).

Providing a large resource supply (high activity rate) at a low actual utilization may be disadvantageous especially for battery-powered devices. An example for this is a battery-operated base station (e.g. of a PAN network, possibly in the so-called repeater operation) which operates the receiver during all active resources of the channel access pattern and therefore uses energy.

Thus, it can be useful to adapt the mean activity rate dynamically, i.e. the temporal density of the resources offered by the channel access pattern 110, with respect to the existing utilization conditions. If the activity rate of the channel access pattern 110 is changed, this is accordingly signaled to the participants in the network, to which end the beacon signal (or also dedicated signaling resources) may be used, for example.

If a terminal device 106 is in an extended idle state (energy-saving mode), it may not receive the emitted signaling information of the base station 104 about a possibly changed channel access pattern during the idle state. In such a scenario, it may be useful for a channel access pattern 110 to provide a minimum supply of (basic) resources that is available at any time and without special signaling, and an additional supply of resources that may be added depending on the utilization and that is subject to appropriate signaling.

Figure 14:
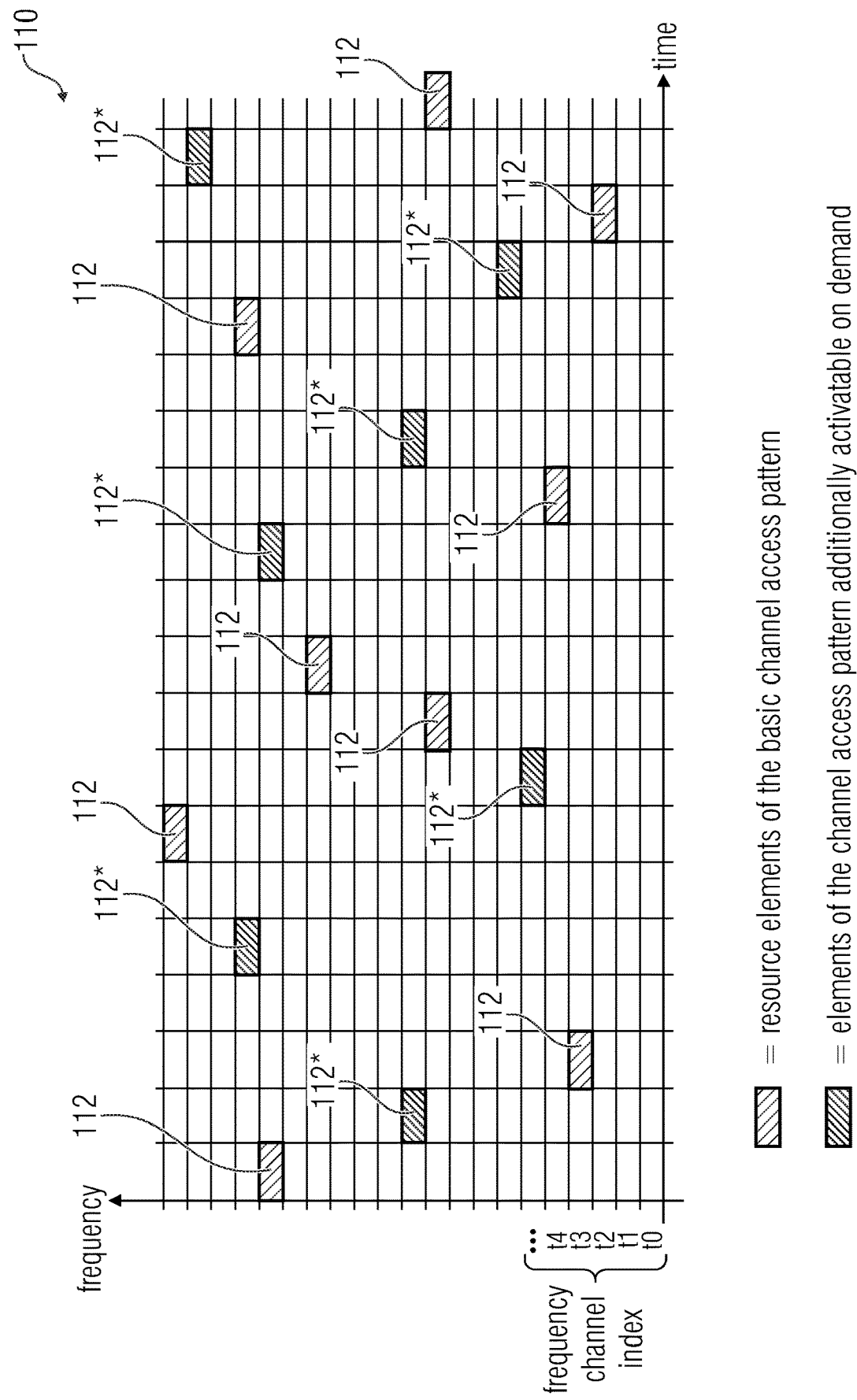
FIG. 14 shows, in a diagram, a frequency hop-based and time hop-based occupancy of the resources of the frequency band defined by a channel access pattern, wherein the channel access pattern additionally comprises resources activatable on demand, according to an embodiment of the present invention.

In the above sense, e.g., resources additionally added to the channel access pattern may be arranged temporally after the basic resources, or may be arranged interleaved with them in the time/frequency grid, as is shown in FIG. 14.

In detail, FIG. 14 shows, in a diagram, a frequency hop-based and time hop-based occupancy of the resources 112 of the frequency band defined by a channel access pattern 110, wherein the channel access pattern 110 additionally comprises resources 112* activatable on demand, according to an embodiment of the present invention. Here, the ordinate describes the frequency channel indices and the abscissa describes the time slot indices.

In other words, FIG. 14 shows an example for interleaved basic and additional resources.

6. Adaptive Frequency Domain Occupancy

In certain unlicensed frequency bands, users may possibly decide themselves without regulatory restrictions which frequency ranges they use within the frequency band. This may lead to the fact that certain areas of the available frequency band are occupied more heavily by external users than others and are therefore exposed to stronger disturbances.

If a base station 104 determines such a medium- or long term asymmetric utilization of the frequency band (e.g. through signal-to-interference power estimations per frequency channel based on received signals), the above-average occupied range of the frequency band may be avoided for the use by the own network by not including the associated frequency channels into the channel access pattern. This is to be considered in the frequency/time mapper (cf. FIG. 5 or 6) and is appropriately signaled to all network participants.

For example, the group of the excluded frequency channels may be described by corresponding start and end frequency channel indices or by a start frequency channel index and a following channel quantity.

Figure 15:
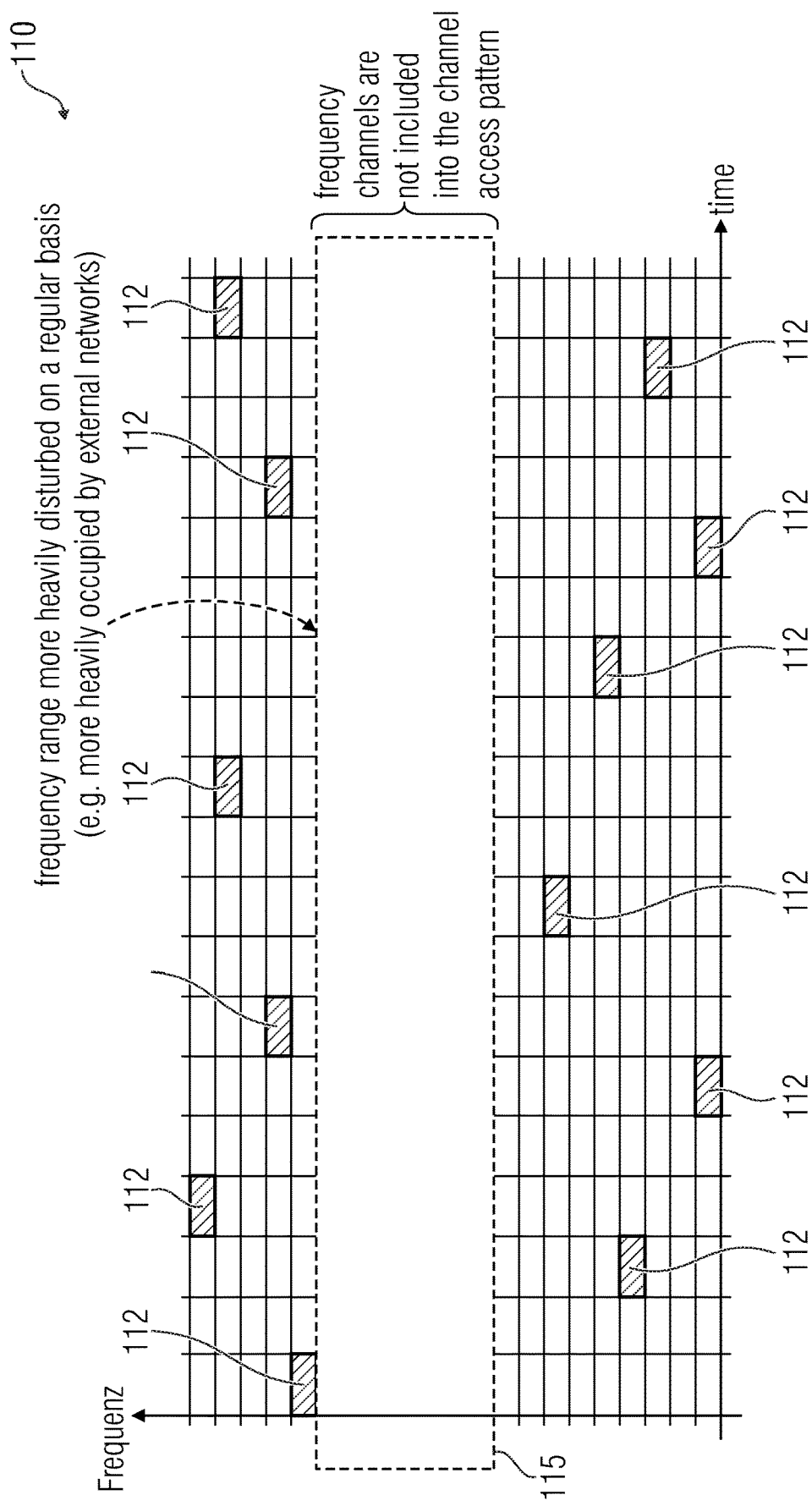
FIG. 15 shows, in a diagram, a frequency hop-based and time hop-based occupancy of the resources of the frequency band defined by a channel access pattern, wherein a frequency range of the frequency band that is regularly disturbed more heavily is not occupied by the channel access pattern, according to an embodiment of the present invention.

FIG. 15 shows, in a diagram, a frequency hop-based and time hop-based occupancy of the resources 112 of the frequency band defined by a channel access pattern 110, wherein a frequency domain 115 of the frequency band that is regularly disturbed more heavily is not occupied by the channel access pattern 110, according to an embodiment of the present invention. Here, the ordinate describes the frequency channel indices and the abscissa describes the time slot indices.

As can be seen in FIG. 15, a frequency domain 115 that is regularly disturbed more heavily (e.g. heavily occupied by external networks) may be considered when generating the channel access pattern 110. Thus, frequency channels of this frequency domain 115 are not included into the channel access pattern 110.

In other words, FIG. 15 shows an example of the exclusion of heavily disturbed frequency channels from the channel access pattern.

With avoiding disturbance-prone frequency domains for the data transfer in the own network, there is a certain utilization balancing across the frequency band by other networks not experiencing any additional disturbances in the already heavily utilized frequency domains.

7. Bundling Resource Elements in the Frequency Domain (Frequency Channel Bundling)

Depending on the hardware and software used, it is possible for a base station 104 to receive on several frequency channels simultaneously (frequency channel bundling). In this case, it is advantageous, especially with more heavily utilized systems, to accordingly increase the number of the resource elements offered within the network in the frequency dimension and to include several frequency channels within a time slot into the channel access pattern, as is shown in FIG. 16.

Figure 16:
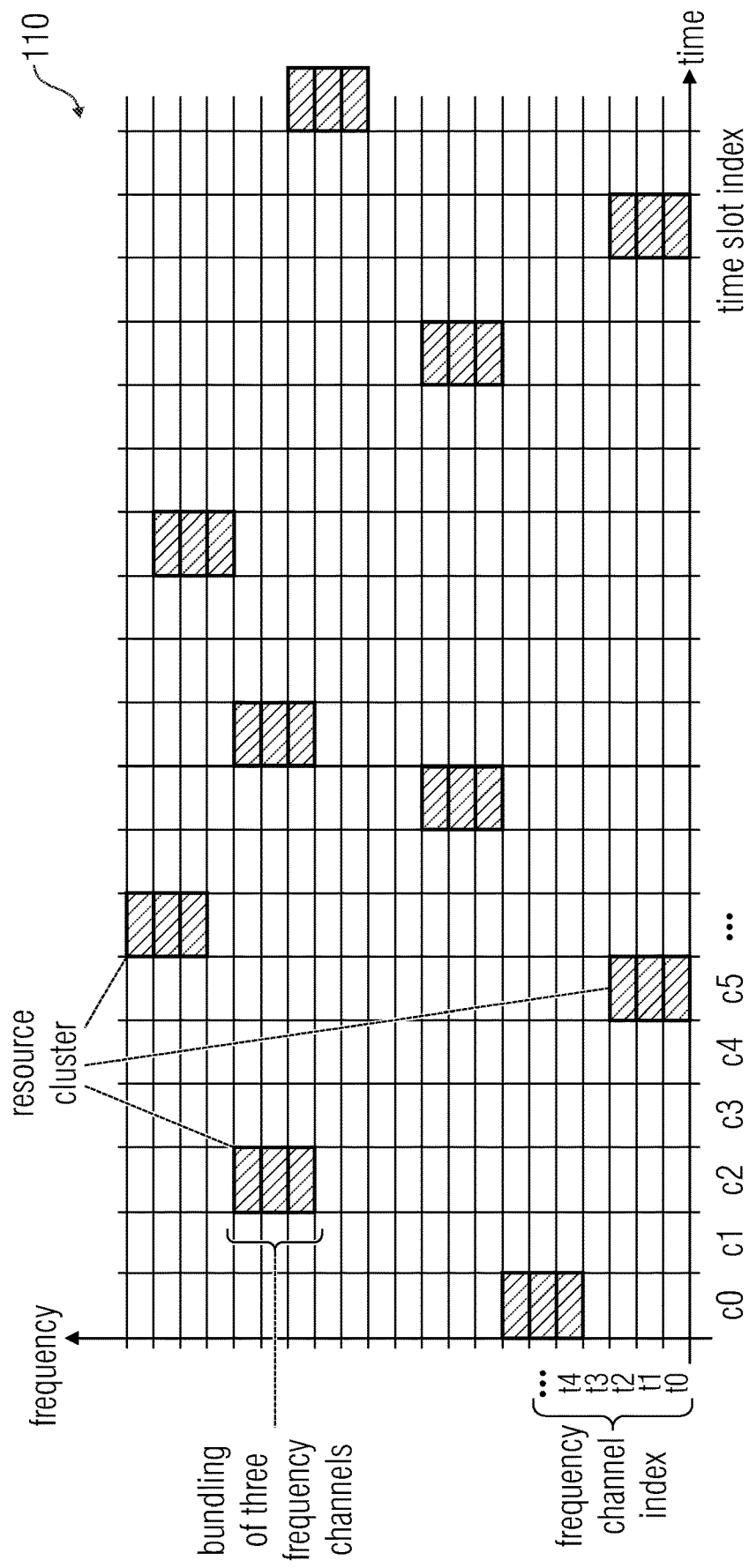
FIG. 16 shows, in a diagram, a frequency hop-based and time hop-based occupancy of the resources of the frequency band defined by a channel access pattern, wherein resources in the frequency domain are bundled, according to an embodiment of the present invention.

In detail, FIG. 16 shows, in a diagram, a frequency hop-based and time hop-based occupancy of the resources 112 of the frequency band defined by a channel access pattern 110, wherein resources 112 are bundled in the frequency domain, according to an embodiment. Here, the ordinate describes the frequency channel indices and the abscissa describes the time slot indices.

In other words, FIG. 16 shows an exemplary illustration of the channel access pattern 110 with the bundling of three adjacent frequency channels into resource clusters, respectively. In this case, FIG. 16 exemplarily illustrates the bundling of three frequency channels, respectively. Each group of resource elements of a time slot may be referred to as a "resource cluster". The channel access pattern 110 may be extended by the information about the number of the frequency channels constituting a resource cluster.

In a further embodiment, the frequency channels grouped into resource clusters do not necessarily have to be immediately adjacent.

8. Further Embodiments

Figure 17:
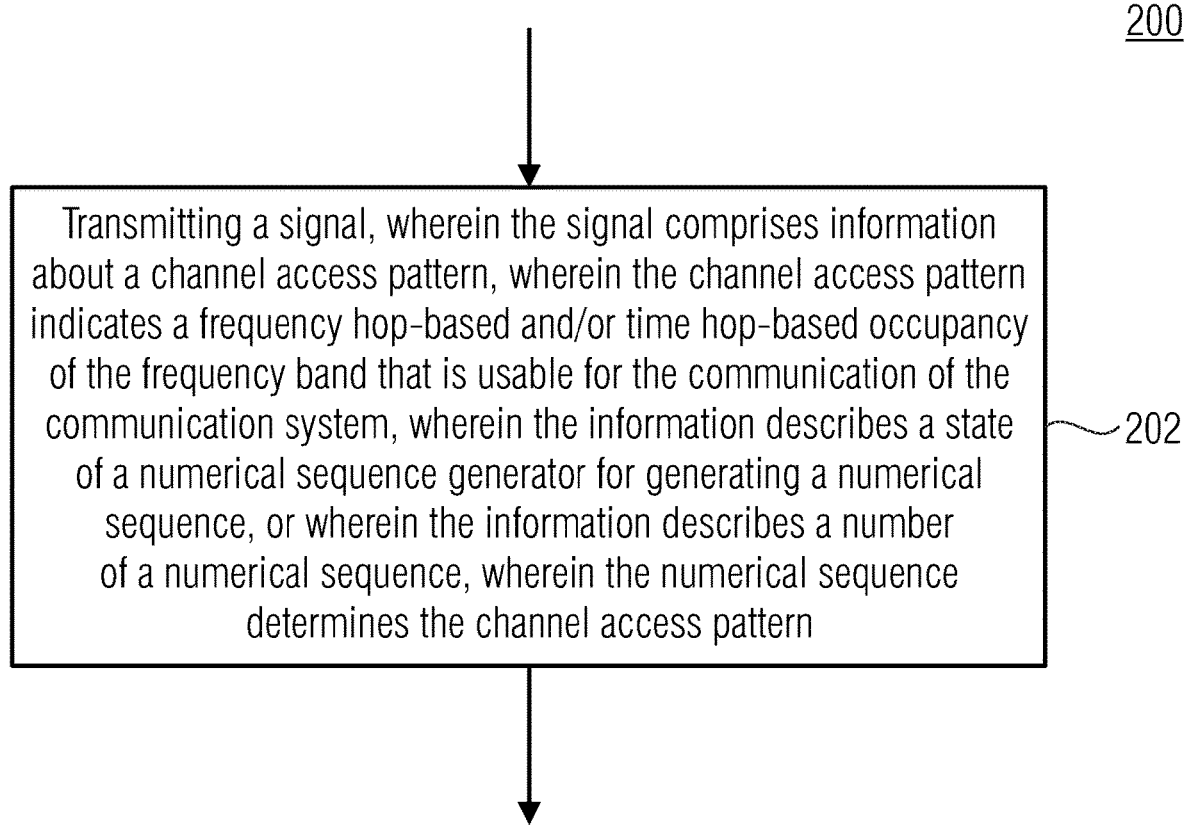
FIG. 17 shows a flow diagram of a method for operating a base station of a communication system that wirelessly communicates in a frequency band that is used for communication by a plurality of communication systems, according to an embodiment of the present invention.

FIG. 17 shows a method 200 for operating a base station of a communication system, wherein the communication system wirelessly communicates in a frequency band that is used for communication by a plurality of communication systems, according to an embodiment of the present invention. The method 200 includes a step 202 of transmitting a signal, wherein the signal comprises information about a channel access pattern, wherein the channel access pattern indicates a frequency hop-based and/or time hop-based occupancy of the frequency band that is usable for the communication of the communication system, wherein the information describes a state of a numerical sequence generator for generating a numerical sequence, or wherein the information describes a number of a numerical sequence, wherein the numerical sequence determines the channel access pattern.

FIG. 18 shows a method 210 for operating a terminal point of a communication system, wherein the communication system wirelessly communicates in a frequency band that is used for communication by a plurality of communication systems, according to an embodiment of the invention. The method 210 includes a step 212 of receiving a signal, wherein the signal comprises information about a channel access pattern, wherein the channel access pattern indicates a frequency hop-based and/or time hop-based occupancy of the frequency band that is usable for the communication of the communication system. In addition, the method 210 includes a step 214 of identifying the channel access pattern on the basis of the information about the channel access pattern, wherein the information describes a state of a numerical sequence generator for generating a numerical sequence, or wherein the information describes a number of a numerical sequence, wherein the numerical sequence determines the channel access pattern.

Figure 19:
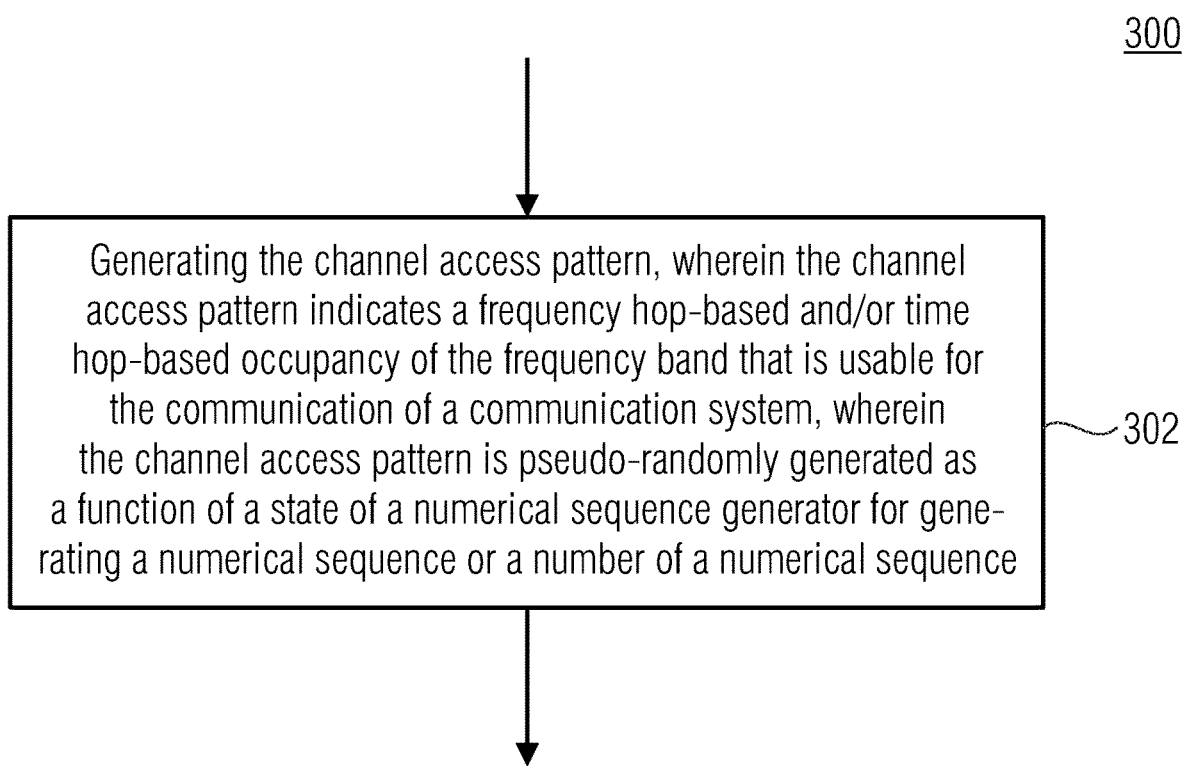
FIG. 19 shows a flow diagram of a method for generating a channel access pattern, according to an embodiment of the present invention.

FIG. 19 shows a method 300 for generating a channel access pattern, according to an embodiment of the present invention. The method 300 includes a step 302 of generating the channel access pattern, where the channel access pattern indicates a frequency hop-based and/or time hop-based occupancy of the frequency band that is usable for the communication of a communication system, wherein the communication system wirelessly communicates in a frequency band that is used for communication by a plurality of communication systems, wherein the channel access pattern is generated as a function of a state of a numerical sequence generator for generating a numerical sequence or a number of a numerical sequence.

Figure 20:
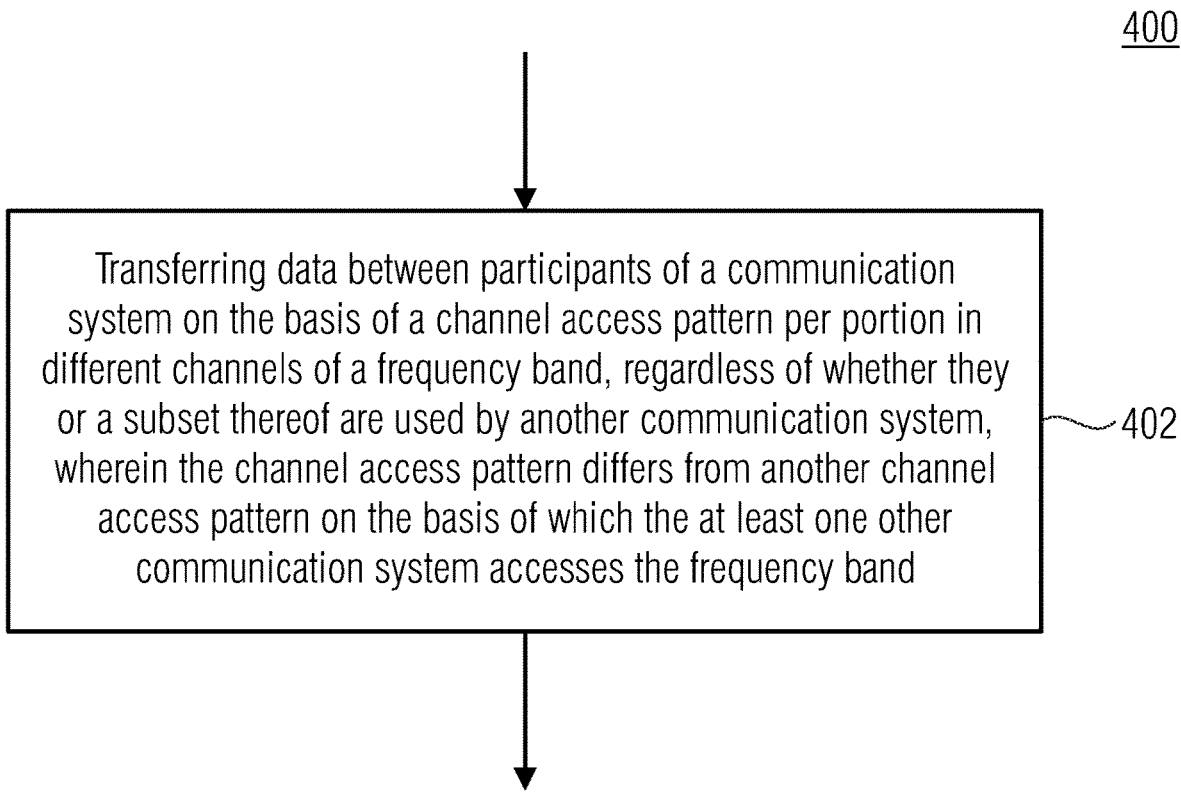
FIG. 20 shows a flow diagram of a method for operating a communication system that wirelessly communicates in a frequency band that is used for communication by a plurality of communication systems.

FIG. 20 shows a method 400 for operating a communication system, wherein the communication system is configured to wirelessly communicate in a frequency band that is used for communication by a plurality of communication systems, according to embodiments of the present invention. The method 400 includes a step 402 of transferring data between participants of the communication system per portion in different channels of the frequency band on the basis of a channel access pattern, regardless of whether they or a subset thereof are used by another communication system, wherein the channel access pattern differs from another channel access pattern on the basis of which at least one other communication system of the plurality of other communication systems accesses the frequency band.

FIG. 21 shows a method 500 for operating two communication systems in a frequency band that is used for wireless communication by a plurality of communication systems. The method 500 includes a step 502 of transferring data between participants of the first communication system on the basis of a first channel access pattern per portion in different channels of the frequency band, regardless of whether they or a subset thereof are used by another communication system. In addition the method includes a step 504 of transferring data between participants of the second communication system on the basis of a second channel access pattern per portion in different channels of the frequency band, regardless of whether they or a subset thereof are used by another communication system, wherein the first channel access pattern and the second channel access pattern are different.

Embodiments refer to generation and application of network-individual channel access patterns, comprising at least one of the following characteristics:
- the channel access patterns contain amongst themselves as few overlapping partial sequences as possible,
- there is a large supply of channel access patterns (e.g. in areas with a high network density),
- the channel access patterns are designed such that they have a very high periodicity,
- the channel access patterns lead (if there are corresponding requirements) to an use of the available frequency channels that is uniform on average,
- signaling of the applied pattern is done by the coordinating instance with as little signaling information as possible, and
- terminal devices may already determine the content of the access pattern at any future time when the signaling of the channel access is received once and completely (this enables terminal devices, e.g. for energy saving reasons, to introduce longer reception pauses and to determine the valid channel access pattern on the basis of information received before the reception pause, when being switched on again.

Embodiments are used in systems for radio transfer of data from terminal devices to a base station and from one/several base stations to terminal devices. For example, the system may be a personal area network (PAN) or a low power wide area network (LPWAN), wherein the terminal devices may be battery-operated sensors (sensor nodes), for example.

Embodiments concern application cases in which a multitude of mutually not coordinated radio-based networks are operated in a common frequency band, wherein the participants of different networks are in a mutual reception range and their signals are therefore a potential mutual source of disturbance (cf. FIG. 2).

As mentioned above, the embodiments described herein may be used to transfer data between the participants of the communication system on the basis of the telegram splitting method. In the telegram splitting method, data, e.g. a telegram or a data packet, is divided into a plurality of sub-data packets (or partial data packets or partial packets), and the sub-data packets are transferred by using a time hop pattern and/or a frequency hop pattern, distributed in time and/or frequency, from a participant to another participant (e.g. from the base station to the terminal point, or from the terminal point to the base station) of the communication system, wherein the participant that receives the sub-data packets rejoins (or combines) them so as to obtain the data packet. Each of the sub-data packets contains only a part of the data packet. Furthermore, the data packet may be channel-encoded so that not all of the sub-data packets are needed to decode the data packet faultlessly, but only a part of the sub-data packets.

In the transfer of data on the basis of the telegram splitting method, the sub-data packets may be transferred distributed in a subset (e.g. a selection) of the available resources of the network-specific channel access pattern. For example, one sub-data packet may be transferred per resource.

In other words, embodiments may be advantageously used in systems in which a message (data packet) is transferred in several partial data packets (so-called telegram splitting, cf. DE 10 2011 082 098).

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY

[1] DE 10 2011 082 098 B4
[2] DE 10 2017 206 236

LIST OF ABBREVIATIONS

CRC: Cyclic Redundancy Check
LPWAN: Low Power Wide Area Network
LSB: Least Significant Bit(s)
MSB: Most Significant Bit(s)
PAN: Personal Area Network
TLS: Transport Layer Security
TSMA: Telegram-Splitting-Multiple-Access

APPENDIX

```
MATLAB code for section 2:
N_freq=72;
N_time=1500000;
N_low=21;
N_high=51;
rand('state',0);
fc=zeros(1,N_time);
R_f=randint(1,10*N_time,2*N_high+1);
R_f=R_f-N_high;
idx=find(R_f>-N_low & R_f<N_low);
R_f(idx)=[ ];
R_f=R_f(1:N_time);
fc(1)=30;
for p=1:N_time-1;
    fc(p+1)=mod(fc(p)+R_f(p),N_freq); % frequency channel index
```

APPENDIX-continued

```
end
Delt_fc1 = (fc(2:end)-fc(1:end-1)); % index difference of consecutive accesses
figure(1); hist(Delt_fc1,-72:72);
h=gca; set(h,'XLim', [-72 72]);
xlabel('\Deltafi'); ylabel('number of results');
title('histogram of \Deltafi');
```

The invention claimed is:

1. A base station of a communication system, wherein the communication system wirelessly communicates in a frequency band that is used for communication by a plurality of communication systems,
    wherein the base station is configured to transmit a signal, wherein the signal comprises information about a channel access pattern, wherein the channel access pattern indicates a frequency hop-based and/or time hop-based occupancy of the frequency band that is usable for the communication of the communication system, wherein the information describes a state of a numerical sequence generator for generating a numerical sequence, wherein the numerical sequence determines the channel access pattern,
    wherein the base station is configured to communicate with a participant of the communication system by using a real subset of resources determined by the channel access pattern.

2. The base station according to claim 1, wherein the channel access pattern differs from another channel access pattern on a basis of which at least one other communication system of a plurality of other communication systems accesses the frequency band.

3. The base station according to claim 1, wherein the base station is configured to operate uncoordinatedly with respect to other communication systems.

4. The base station according to claim 1,
    wherein the base station is configured to emit the signal with the information about the channel access pattern multiple times,
    wherein the information about the channel access pattern transferred with consecutive emissions of the signal describes different states of the numerical sequence generator or different numbers of the numerical sequence.

5. The base station according to claim 4, wherein the information transferred with the emissions of the signal describes only a subset of the states of the numerical sequence generator or of the numbers of the numerical sequence.

6. The base station according to claim 1,
    wherein the information about the channel access pattern is the state of the numerical sequence generator or information derived therefrom, or
    wherein the information about the channel access pattern is the number of the numerical sequence or information derived therefrom.

7. The base station according to claim 1, wherein the base station is configured to identify the channel access pattern as a function of the state of the numerical sequence generator or of a number of the numerical sequence derived from the state of the numerical sequence generator.

8. The base station according to claim 7,
    wherein states of the numerical sequence generator following the state of the numerical sequence generator are identifiable on a basis of the state of the numerical sequence generator, wherein the base station is configured to identify the channel access pattern as a function of the following states of the numerical sequence generator or following numbers of the numerical sequence derived therefrom.

9. The base station according to claim 1, wherein the base station is configured to identify the channel access pattern as a function of individual information of the communication system.

10. The base station according to claim 9, wherein the individual information of the communication system is intrinsic information of the communication system.

11. The base station according to claim 10, wherein the intrinsic information of the communication system is a network-specific identifier.

12. The base station according to claim 11, wherein the network-specific identifier is an identification of the communication system.

13. The base station according to claim 1,
wherein the base station is configured to map, by using a mapping function,
the state of the numerical sequence generator or a number of the numerical sequence derived from the state of the numerical sequence generator, or the number of the numerical sequence, and
individual information of the communication system onto time information and frequency information,
wherein the time information and the frequency information describe a resource of the channel access pattern.

14. The base station according to claim 13, wherein the time information describes a time slot or a time slot index.

15. The base station according to claim 13,
wherein, when mapping the time information, the mapping function considers an activity rate of the communication system,
wherein the activity rate is specified before execution, or wherein the signal or a further signal transmitted by the base station comprises information about the activity rate.

16. The base station according to claim 15,
wherein, when mapping onto the time information, the mapping function considers different activity rates of the communication system so that the channel access pattern comprises regions of the different activity rates,
wherein the signal or the further signal comprises information about the different activity rates.

17. The base station according to claim 15, wherein the base station is configured to dynamically adapt the activity rate as a function of a current or predicted utilization situation of the communication system.

18. The base station according to claim 14, wherein, when mapping onto the time information, the mapping function adheres to a specified minimum distance between consecutive time slots or time slot indices of the channel access pattern.

19. The base station according to claim 13, wherein the frequency information describes a frequency channel or a frequency channel index.

20. The base station according to claim 13, wherein the frequency information describes a distance between consecutive frequency channels or frequency channel indices of the channel access pattern.

21. The base station according to claim 19, wherein, when mapping onto the frequency information, the mapping function adheres to a specified minimum distance between consecutive frequency channels or frequency channel indices of the channel access pattern.

22. The base station according to claim 13, wherein, when mapping onto the frequency information, the mapping function considers an interference-prone frequency channel or a range of interference-prone frequency channels of the frequency band so that the interference-prone frequency channel or the range of interference-prone frequency channels is not or less occupied by the channel access pattern.

23. The base station according to claim 13, wherein the frequency information describes a bundling of frequency resources of the frequency band comprising at least two directly adjacent or spaced apart frequency channels or frequency channel indices.

24. The base station according to claim 1,
wherein the base station is configured to identify a pseudo random number R as a function of:
the state of the numerical sequence generator, or a number of the numerical sequence derived from the state of the numerical sequence generator, or the number of the numerical sequence, and
individual information of the communication system,
wherein the pseudo random number R determines the channel access pattern.

25. The base station according to claim 24, wherein the base station is configured to identify a resource of the channel access pattern on a basis of the pseudo random number R.

26. The base station according to claim 1, wherein the signal is a beacon signal.

27. The base station according to claim 1, wherein the numerical sequence generator is a periodic numerical sequence generator for generating a periodic numerical sequence.

28. The base station according to claim 1, wherein the numerical sequence generator is a deterministic random number generator for generating a pseudo-random numerical sequence.

29. The base station according to claim 1,
wherein the state of the numerical sequence generator is a periodic beacon index and/or a periodic time slot index, or
wherein a number derived from the state of the numerical sequence generator is a periodic beacon index and/or a periodic time slot index.

30. The base station according to claim 1, wherein the number of the numerical sequence is a periodic beacon index and/or a periodic time slot index.

31. The base station according to claim 1, wherein an occupancy of the frequency band that is defined by the channel access pattern at least partially overlaps an occupancy of the frequency band by another communication system.

32. A terminal point of a communication system, wherein the communication system wirelessly communicates in a frequency band that is used for communication by a plurality of communication systems,
wherein the terminal point is configured to receive a signal, wherein the signal comprises information about a channel access pattern, wherein the channel access pattern indicates a frequency hop-based and/or time hop-based occupancy of the frequency band that is usable for the communication of the communication system,
wherein the terminal point is configured to identify the channel access pattern on a basis of the information about the channel access pattern, wherein the information describes a state of a numerical sequence generator for generating a numerical sequence, wherein the numerical sequence determines the channel access pattern, wherein the terminal point is configured to communicate with a participant of the communication system by using a real subset of resources determined by the channel access pattern.

33. The terminal point according to claim 32, wherein the channel access pattern differs from another channel access pattern on a basis of which at least one other communication system of a plurality of other communication systems accesses the frequency band.

34. The terminal point according to claim 32, wherein the terminal point is configured to operate uncoordinatedly with respect to other communication systems.

35. The terminal point according to claim 32, wherein the terminal point is configured to receive the signal with the information about the channel access pattern multiple times, wherein the information about the channel access pattern transferred with consecutive emissions of the signal describes different states of the numerical sequence generator or different numbers of the numerical sequence, wherein the terminal point is configured to identify the channel access pattern on a basis of the information about the channel access pattern.

36. The terminal point according to claim 35, wherein the information transferred with the emissions of the signal describes only a subset of the states of the numerical sequence generator or of the numbers of the numerical sequence.

37. The terminal point according to claim 32, wherein the information about the channel access pattern is the state of the numerical sequence generator or information derived therefrom, or wherein the information about the channel access pattern is the number of the numerical sequence or information derived therefrom.

38. The terminal point according to claim 32, wherein the terminal point is configured to identify the channel access pattern as a function of the state of the numerical sequence generator or of a number of the numerical sequence derived from the state of the numerical sequence generator.

39. The terminal point according to claim 32, wherein states of the numerical sequence generator following the state of the numerical sequence generator are identifiable on a basis of the state of the numerical sequence generator, wherein the terminal point is configured to identify the channel access pattern as a function of the following states of the numerical sequence generator or following numbers of the numerical sequence derived therefrom.

40. The terminal point according to claim 32, wherein the terminal point is configured to identify the channel access pattern as a function of individual information of the communication system.

41. The terminal point according to claim 40, wherein the individual information of the communication system is intrinsic information of the communication system.

42. The terminal point according to claim 41, wherein the intrinsic information of the communication system is a network-specific identifier.

43. The terminal point according to claim 42, wherein the network-specific identifier is an identification of the communication system.

44. The terminal point according to claim 32, wherein the terminal point is configured to map, by using a mapping function, the state of the numerical sequence generator or a number of the numerical sequence derived from the state of the numerical sequence generator, or the number of the numerical sequence, and individual information of the communication system onto time information and frequency information, wherein the time information and the frequency information describe a resource of the channel access pattern.

45. The terminal point according to claim 44, wherein the time information describes a time slot or a time slot index.

46. The terminal point according to claim 44, wherein, when mapping the time information, the mapping function considers an activity rate of the communication system, wherein the activity rate is specified before execution, or wherein the signal or a further received signal comprises information about the activity rate.

47. The terminal point according to claim 46, wherein, when mapping onto the time information, the mapping function considers different activity rates of the communication system so that the channel access pattern comprises regions of the different activity rates, wherein the signal or the further signal comprises information about the different activity rates.

48. The terminal point according to claim 46, wherein the signal comprises information about activity rates of the communication system, or wherein the terminal point is configured to receive a further signal, wherein the further signal comprises information about the activity rates of the communication system.

49. The terminal point according to claim 45, wherein, when mapping onto the time information, the mapping function adheres to a specified minimum distance between consecutive time slots or time slot indices of the channel access pattern.

50. The terminal point according to claim 44, wherein the frequency information describes a frequency channel or a frequency channel index.

51. The terminal point according to claim 44, wherein the frequency information describes a distance between consecutive frequency channels or frequency channel indices of the channel access pattern.

52. The terminal point according to claim 50, wherein, when mapping onto the frequency information, the mapping function adheres to a specified minimum distance between consecutive frequency channels or frequency channel indices of the channel access pattern.

53. The terminal point according to claim 44, wherein, when mapping onto the frequency information, the mapping function considers an interference-prone frequency channel or a range of interference-prone frequency channels of the frequency band so that the interference-prone frequency channel or the range of interference-prone frequency channels is not or less occupied by the channel access pattern.

54. The terminal point according to claim 39, wherein the frequency information describes at least two directly adjacent or spaced apart frequency channels or frequency channel indices.

55. The terminal point according to claim 32, wherein the terminal point is configured to identify a pseudo random number R as a function of:

the state of the numerical sequence generator, or a number of the numerical sequence derived from the state of the numerical sequence generator, or the number of the numerical sequence, and individual information of the communication system, wherein the pseudo random number R determines the channel access pattern.

56. The terminal point according to claim 55, wherein the terminal point is configured to identify a resource of the channel access pattern on a basis of the pseudo random number R.

57. The terminal point according to claim 32, wherein the signal is a beacon signal.

58. The terminal point according to claim 32, wherein the numerical sequence generator is a periodic numerical sequence generator for generating a periodic numerical sequence.

59. The terminal point according to claim 32, wherein the numerical sequence generator is a deterministic random number generator for generating a pseudo-random numerical sequence.

60. The terminal point according to claim 32, wherein the state of the numerical sequence generator is a periodic beacon index and/or a periodic time slot index, or wherein a number derived from the state of the numerical sequence generator is a periodic beacon index and/or a periodic time slot index.

61. The terminal point according to claim 32, wherein the number of the numerical sequence is a periodic beacon index and/or a periodic time slot index.

62. The terminal point according to claim 32, wherein an occupancy of the frequency band defined by the channel access pattern at least partially overlaps an occupancy of the frequency band by another communication system.

63. A communication system, comprising:

a base station of the communication system, wherein the communication system wirelessly communicates in a frequency band that is used for communication by a plurality of communication systems, wherein the base station is configured to transmit a signal, wherein the signal comprises information about a channel access pattern, wherein the channel access pattern indicates a frequency hop-based and/or time hop-based occupancy of the frequency band that is usable for the communication of the communication system, wherein the information describes a state of a numerical sequence generator for generating a numerical sequence, wherein the numerical sequence determines the channel access pattern, wherein the base station is configured to communicate with a participant of the communication system by using a real subset of resources determined by the channel access pattern; and at least one terminal point of the communication system, wherein the communication system wirelessly communicates in a frequency band that is used for communication by a plurality of communication systems, wherein the terminal point is configured to receive a signal, wherein the signal comprises information about a channel access pattern, wherein the channel access pattern indicates a frequency hop-based and/or time hop-based occupancy of the frequency band that is usable for the communication of the communication system, wherein the terminal point is configured to identify the channel access pattern on a basis of the information about the channel access pattern, wherein the information describes a state of a numerical sequence generator for generating a numerical sequence, wherein the numerical sequence determines the channel access pattern, wherein the terminal point is configured to communicate with a participant of the communication system by using a real subset of resources determined by the channel access pattern.

64. A method for operating a base station of a communication system, wherein the communication system wirelessly communicates in a frequency band that is used for communication by a plurality of communication systems, the method comprising:

transmitting a signal, wherein the signal comprises information about a channel access pattern, wherein the channel access pattern indicates a frequency hop-based and/or time hop-based occupancy of the frequency band that is usable for the communication of the communication system, wherein the information describes a state of a numerical sequence generator for generating a numerical sequence, wherein the numerical sequence determines the channel access pattern; and communicating with a participant of the communication system by using a real subset of resources determined by the channel access pattern.

65. A method for operating a terminal point of a communication system, wherein the communication system wirelessly communicates in a frequency band that is used for communication by a plurality of communication systems, the method comprising:

receiving a signal, wherein the signal comprises information about a channel access pattern, wherein the channel access pattern indicates a frequency hop-based and/or time hop-based occupancy of the frequency band that is usable for the communication of the communication system;

identifying the channel access pattern on a basis of the information about the channel access pattern, wherein the information describes a state of a numerical sequence generator for generating a numerical sequence, wherein the numerical sequence determines the channel access pattern; and communicating with a participant of the communication system by using a real subset of resources determined by the channel access pattern.

66. A non-transitory digital storage medium having a computer program stored thereon to perform a method for operating a base station of a communication system, wherein the communication system wirelessly communicates in a frequency band that is used for communication by a plurality of communication systems, the method comprising:

transmitting a signal, wherein the signal comprises information about a channel access pattern, wherein the channel access pattern indicates a frequency hop-based and/or time hop-based occupancy of the frequency band that is usable for the communication of the communication system, wherein the information describes a state of a numerical sequence generator for generating a numerical sequence, wherein the numerical sequence determines the channel access pattern; and communicating with a participant of the communication system by using a real subset of resources determined by the channel access pattern, when said computer program is run by a computer.

67. A non-transitory digital storage medium having a computer program stored thereon to perform a method for operating a terminal point of a communication system, wherein the communication system wirelessly communicates in a frequency band that is used for communication by a plurality of communication systems, the method comprising:

receiving a signal, wherein the signal comprises information about a channel access pattern, wherein the channel access pattern indicates a frequency hop-based and/or time hop-based occupancy of the frequency band that is usable for the communication of the communication system;

identifying the channel access pattern on a basis of the information about the channel access pattern, wherein the information describes a state of a numerical sequence generator for generating a numerical sequence, wherein the numerical sequence determines the channel access pattern; and communicating with a participant of the communication system by using a real subset of resources determined by the channel access pattern, when said computer program is run by a computer.

* * * * *